US008095676B2

(12) United States Patent
Kaji et al.

(10) Patent No.: US 8,095,676 B2
(45) Date of Patent: Jan. 10, 2012

(54) MEDIATING SYSTEM AND METHOD TO ESTABLISH COMMUNICATION SESSION, ALLOWING PRIVATE INFORMATION TO BE PROTECTED

(75) Inventors: Tadashi Kaji, Yokohama (JP); Osamu Takata, Tokyo (JP); Takahiro Fujishiro, Yokohama (JP); Kazuyoshi Hoshino, Tokyo (JP)

(73) Assignee: Hitachi Ltd., Tokyo (JP)

( * ) Notice: Subject to any disclaimer, the term of this patent is extended or adjusted under 35 U.S.C. 154(b) by 475 days.

(21) Appl. No.: 11/504,765

(22) Filed: Aug. 16, 2006

(65) Prior Publication Data
US 2007/0168521 A1 Jul. 19, 2007

(30) Foreign Application Priority Data

Jan. 18, 2006 (JP) .................................. 2006-009389

(51) Int. Cl.
*G06F 15/16* (2006.01)
(52) U.S. Cl. ...................... 709/230; 709/203; 709/217
(58) Field of Classification Search .......... 709/204–207, 709/227–229, 230
See application file for complete search history.

(56) References Cited

U.S. PATENT DOCUMENTS

| 6,401,122 | B1* | 6/2002 | Matsui et al. ................ 709/227 |
| 2001/0016915 | A1 | 8/2001 | Sugano et al. |
| 2004/0111521 | A1 | 6/2004 | Igarashi et al. |
| 2004/0165587 | A1* | 8/2004 | Kiyoto et al. ................ 370/389 |
| 2005/0021773 | A1* | 1/2005 | Shiga et al. .................. 709/228 |
| 2006/0067287 | A1* | 3/2006 | Kim et al. .................... 370/338 |
| 2006/0089998 | A1* | 4/2006 | Kim et al. .................... 709/229 |
| 2007/0136475 | A1* | 6/2007 | Leppisaari et al. ........... 709/227 |

FOREIGN PATENT DOCUMENTS

| EP | 1 257 129 A1 | 11/2002 |
| EP | 1 422 909 A2 | 5/2004 |
| JP | 2001-078167 | 3/2001 |
| JP | 2004-172782 | 6/2004 |
| JP | 2004-172782 A | 6/2004 |

OTHER PUBLICATIONS

European Search Report issued in corresponding European Patent Application No. 06017064,4-1244, dated Apr. 18, 2007.
J. Rosenberg, et al., "SIP: Session Initiation Protocol," IETF, RFC3261, Jun. 2002, The Internet Society.
Japanese Office Action, w/ English translation thereof, issued in Japanese Patent Application No. 2006-009389, dated May 31, 2011.

\* cited by examiner

Primary Examiner — Ian N Moore
Assistant Examiner — Jenee Alexander
(74) Attorney, Agent, or Firm — McDermott Will & Emery LLP

(57) ABSTRACT

The present invention is to prevent user's attribute information from being distributed, in the case where it is to be determined whether or not the attribute information (for example, age, address, and the like) of the user satisfies a service providing condition, when a communication session is established across multiple session managing servers.
According to the present invention, attribute information of a user who is using a client logging in a session managing server, and attribute information of a service operating on the client are managed, a condition (SEP) to establish a communication session among multiple session managing servers related to the session establishment is shared, and the session managing server which manages the attribute information compares the attribute information and the SEP to make an access judgment, in order to determine whether or not the communication session is to be established.

9 Claims, 14 Drawing Sheets

FIG. 2

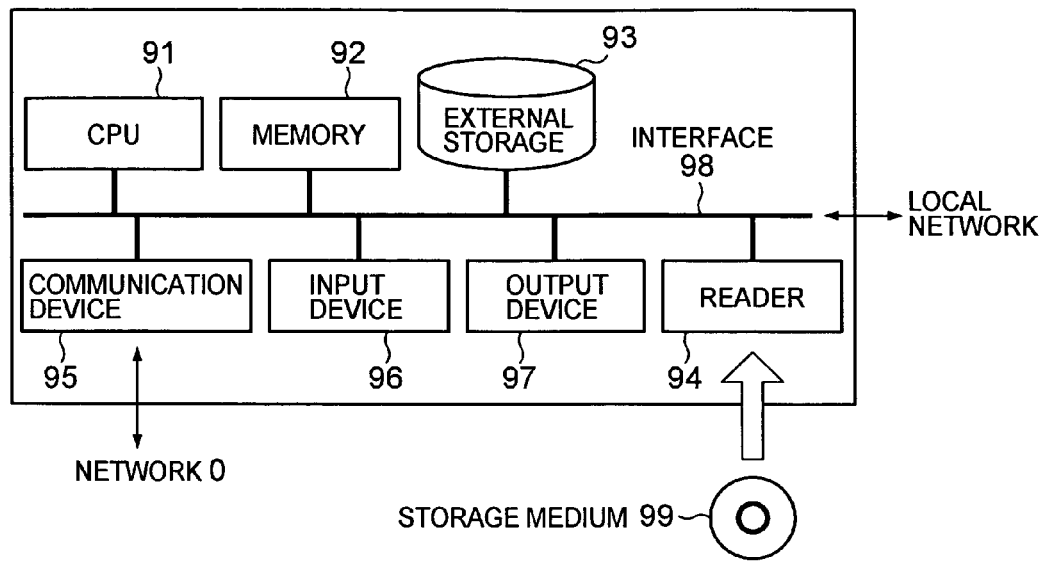

FIG. 3

| SIP-URI FIELD 3101 | SEP FIELD 3102 | |
|---|---|---|
| sip:user11@sip1.hitachi.jp | RECOMMENDED AGE >= 18 | SEP6₁₁ |
| sip:user12@sip1.hitachi.jp | VIOLENCE = × & SEXUAL EXPRESSION = × | SEP6₁₂ |
| sip:user1n@sip1.hitachi.jp | RECOMMENDED AGE < 13 & VIOLENCE = × SEXUAL EXPRESSION = × | SEP6₁₄ |
| ⋮ | ⋮ | |
| sip:service21@sip2.hitachi.jp | ADDRESS = (TOKYO\|KANAGAWA\|SAITAMA\|CHIBA) & AGE >= 20 & AGE < 30 & SEX = MALE | SEP6₂₁ |
| sip:service22@sip2.hitachi.jp | AGE >= 18 | SEP6₂₂ |
| sip:service23@sip2.hitachi.jp | ADDRESS = (OSAKA\|KYOTO\|HYOGO) & AGE >= 13 & SEX = FEMALE | SEP6₂₃ |
| ⋮ | ⋮ | |

FIG. 4A

USER ATTRIBUTE INFORMATION TABLE 411

SIP-URI FIELD 4110, NAME FIELD 4111, ADDRESS FIELD 4112, AGE FIELD 4113, SEX FIELD 4114, OCCUPATION FIELD 4115

| SIP-URI | NAME | ADDRESS | AGE | SEX | OCCUPATION |
|---|---|---|---|---|---|
| sip:user11@sip1.hitachi.jp | USER $1_1$ | TOKYO | 25 | MALE | OFFICE WORKER |
| sip:user12@sip1.hitachi.jp | USER $1_2$ | AICHI | 20 | FEMALE | STUDENT |
| sip:user13@sip1.hitachi.jp | USER $1_3$ | HOKKAIDO | 35 | FEMALE | HOUSEWIFE |
| ⋮ | ⋮ | ⋮ | ⋮ | ⋮ | ⋮ |
| sip:user1n@sip1.hitachi.jp | USER $1_n$ | OSAKA | 12 | MALE | STUDENT |

FIG. 4B

SERVICE ATTRIBUTE INFORMATION TABLE 412

SIR-URI FIELD 4120, NAME FIELD 4121, RECOMMENDED AGE FIELD 4122, VIOLENCE FIELD 4123, SEXUAL EXPRESSION FIELD 4124

| SIR-URI | NAME | RECOMMENDED AGE | VIOLENCE | SEXUAL EXPRESSION |
|---|---|---|---|---|
| sip:service21@sip2.hitachi.jp | SERVICE $2_1$ | 5 | × | × |
| sip:service22@sip2.hitachi.jp | SERVICE $2_2$ | 20 | ○ | ○ |
| sip:service23@sip2.hitachi.jp | SERVICE $2_3$ | 13 | × | × |
| ⋮ | ⋮ | ⋮ | ⋮ | ⋮ |
| sip:service2m@sip2.hitachi.jp | SERVICE $2_m$ | 16 | × | × |

FIG. 5

SIR-URI FIELD 3091, IP ADDRESS FIELD 3092, EFFECTIVE PERIOD FIELD 3092

| SIR-URI | IP ADDRESS | EFFECTIVE PERIOD |
|---|---|---|
| sip:user11@sip1.hitachi.jp | 10.9.8.7 | 2005/06/30/23:55:00 |
| sip:user12@sip1.hitachi.jp | 10.11.12.13 | 2005/06/30/23:55:59 |
| sip:user15@sip1.hitachi.jp | 10.12.14.16 | 2005/07/01 00:00:00 |
| sip:user18@sip1.hitachi.jp | 10.20.30.40 | 2005/07/01 01:00:00 |

FIG. 13

```
INVITE sip:service21@sip2.hitachi.jp SIP/2.0
Max-Forwards:70
To: sip:service21@sip2.hitachi.jp
From: user11@sip1.hitachi.jp
Call-ID:3HLADFY@sip1.hitachi.jp
C S eq:315149 INVITE
Contact: <sip:user11@sip1.hitachi.jp>
Content-Type: application/sdp
Content-Length: 1420

<SEP>
RECOMMENDED AGE >= 18                                    — SEP6_{11}
</SEP>

<PROOF>
<STATEMENT>
TARGET= "sip:user11@ssp1.jp" MEETS
SEP= "ADDRESS = (TOKYO|KANAGAWA|SAITAMA|CHIBA) &
        AGE >= 20 & AGE < 30 & SEX = MALE"
</STATEMENT>
<VerfiedBy>sip1.hitachi.jp<VerifiedBy>
<SIGNATURE>
DKJSAFHJFLHA83HLADFYAPYE3AQP8UHDADAPA987
LADFYAPDFAAP897SFLY7R0E3HLADFYAPYE3AQP8U
HDADAPA FLY7R0E3HLADFYAPYE3AQP8U LADFYAP
DFAAP897SFLY7R0E
</SIGNATURE>
</PROOF>
•••••
```

EVIDENCE DATA 80

FIG. 14

```
SIP/2.0 200 OK
To: sip:user11@sip1.hitachi.jp
From: service21@sip2.hitachi.jp
Call-ID: 3HLADFY@sip1.hitachi.jp
CSeq: 315149 INVITE
Contact: sip:service21@sip2.hitachi.jp
Content-Type: application/sdp
Content-Length: 1301

<PROOF>
<STATEMENT>
TARGET= "sip:service21@sip2.hitachi.jp" MEETS
SEP= "RECOMMENDED AGE >= 18"
</STATEMENT>
<VerifiedBy>sip2.hitachi.jp<VerifiedBy>
<SIGNATURE>
JFLHA83 FLY7R0EPYE3AQP8UHDKJSAFH DADA
PA987DFAAP897SFLYUFP 3HLADFYAPYE3AQP8
UHLADFYA FLY7R0E3HLADFYAPYE3AQP8U
</SIGNATURE>
</PROOF>
.....
```

EVIDENCE DATA 80

FIG. 15A
SEP SENDING REQUEST MESSAGE 60

```
GETSEP
From: ssp1.hitachi.jp
To: service21@ssp2.hitachi.jp
Call-ID: 1727968@ssp1.hitachi.jp
CSeq: 555135631 GETSEP
```

FIG. 15B
SEP SENDING REQUEST MESSAGE 61

```
200 OK
From: service21@ssp2.hitachi.jp
To: ssp1.hitachi.jp
Call-ID: 1727968@ssp1.hitachi.jp
CSeq: 555135631 GETSEP <SEP>
ADDRESS = (TOKYO|KANAGAWA|
                SAITAMA|CHIBA)
& AGE >= 20 & AGE < 30 & SEX = MALE
</SEP>
```

FIG. 15C
SEP REGISTRATION REQUEST MESSAGE 62

```
ADDSEP
From: sip:user11@ssp1.hitachi.jp
To: ssp2.hitachi.jp
Call-ID: 1727968@ssp1.hitachi.jp
CSeq: 555135631 ADDSEP

<SEP>RECOMMENDED AGE >= 18
```

FIG. 15D
SEP DELETION REQUEST MESSAGE 63

```
DELSEP
Max-Forwards: 70
From: sip:user11@ssp1.hitachi.jp
To: ssp2.hitachi.jp
Call-ID: 1727968@ssp1.hitachi.jp
CSeq: 555135631 DELSEP
```

FIG. 16A
EVALUATION REQUEST MESSAGE 70

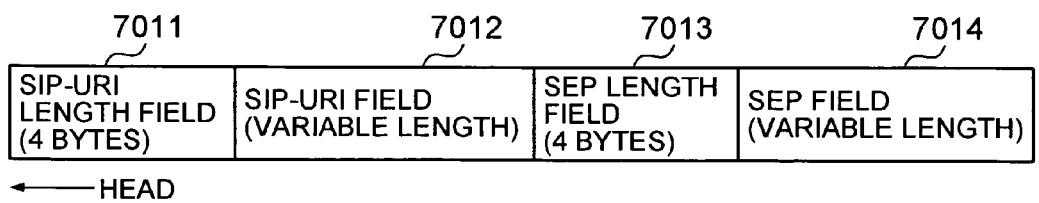

← HEAD

FIG. 16B
JUDGMENT RESULT 71

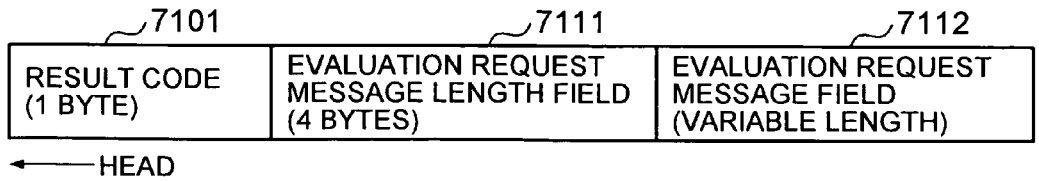

← HEAD

MEDIATING SYSTEM AND METHOD TO ESTABLISH COMMUNICATION SESSION, ALLOWING PRIVATE INFORMATION TO BE PROTECTED

INCORPORATION BY REFERENCE

This application claims priority based on a Japanese patent application, No. 2006-009389 filed on Jan. 18, 2006, the entire contents of which are incorporated herein by reference.

BACKGROUND ART

The present invention relates to an access control in a system which establishes a communication session via multiple session managing servers, by using a control communication protocol among multiple entities.

When data communication is performed, for example, between two entities (for example, two devices or two processes which are implemented by executing software on the devices), a control communication protocol may be used. This control communication protocol is independent from the data communication, so as to control the data communication such as enabling the data communication, shutting down the data communication, and the like. For instance, in a service of IP telephone, a protocol called as SIP (Session Initiation Protocol) is broadly used as a control communication protocol. As to the details of the SIP, see IETF, RFC3261 "SIP: Session Initiation Protocol", IETF, June 2002, URL: http://www.ietf.org/rfc/rfc3261.txt (hereinafter, referred to as Documents 1).

Some of the control communication protocols are developed, assuming a mechanism in which one or multiple session managing servers mediate a process for establishing a communication session between entities (hereinafter, also referred to as "clients"). By way of example, for the above SIP, a session managing server (also referred to as an "SIP server") is brought into practice so that an Internet connection service provider (hereinafter, also referred to as "ISP") provides an IP telephone service among customers of the ISP.

Hereinafter, an operation under the SIP will be briefly explained, in which the session managing server is utilized so that a first client establishes a communication session (hereinafter, also referred to as merely "session") with a second client, thereby enabling the data communication therebetween.

Initially, the first client registers an IP address of its own in the session managing server, prior to the process for establishing the communication session. In other words, this client transmits to the session managing server, a registration request message (also referred to as "REGISTER message") including an identifier (also referred to as SIP-URI) to uniquely identify the client or a user of the client in the session managing server and the IP address of the client. The session managing server records the identifier and the IP address described in the registration request message, in such a manner as being associated with each other.

It is to be noted that the association between the identifier and the IP address of the client, which is recorded in the session managing server, is designed to be deleted after a lapse of effective period given at the time of recording the association. Alternatively, this association may be deleted by sending from the client, a registration delete request message, i.e., REGISTER message that specifies to set zero to the effective period of the association.

In the present specification, a situation in which the identifier and IP address of a client (entity) are recorded, in such a manner as associated with each other in the session managing server, is referred to as "the client logs in the session managing server". On the other hand, a situation in which there is not such recording is referred to as "the client logs out of the session managing server".

Logging-in enables the session managing server to transmit an INVITE message (described below) that is received from a source client, to a destination client. On the other hand, this logging-in also allows the session managing server to accept an INVITE message or the like from the destination client as well.

Similarly, a second client also logs in the session managing server prior to the session establishing processing.

Next, the first client performs a processing to establish a session with the second client.

In other words, the first client transmits to the session managing server, a connection request message (hereinafter, also referred to as "INVITE message") which requests to establish a session with the second client. In this INVITE message, there are described an identifier of the first client and an identifier of the second client. The session managing server which has received the INVITE message transmits the INVITE message to the second client. If the second client that has received the INVITE message accepts the connection request, it transmits to the session managing server a response message indicating the acceptance (also referred to as "200 OK message"). The session managing server returns the response message to the first client. Receiving the response message by the first client indicates that the communication session between the first client and the second client has been established.

In the foregoing description, there have been explained operations for enabling data communication between the first client and the second client to establish a data session therebetween, by utilizing the session managing server under the SIP.

In addition, there is also a case where multiple session managing servers cooperate with one another to control a communication session between two clients. In a situation in which a first client logs in a first session managing server whilst a second client logs in a second session managing server, if the first client tries to establish a session with the second client, the first client firstly transmits the INVITE message to the first session managing server.

The first session managing server which has received the INVITE message transfers the INVITE message to the second session managing server. The second session managing server transfers the INVITE message to the second client. In a similar manner, the second client transmits the response message to the second session managing server. The second session managing server which has received the response message transfers the response message to the first session managing server. The first session managing server transfers the response message to the first client.

For example, in the case of the IP telephone as described above, when an ISP provides its own customer with an IP phone service, each ISP operates the SIP server. Then, the SIP servers cooperate with one another to establish sessions for IP phones, between the IP phone client software programs which are running on terminals owned by the customers.

For the case where an INVITE message is transferred through multiple session managing servers and when the second session managing server has received the INVITE message from the first client as discussed above, there exists a service control method, in which the second session managing server obtains service providing conditions that define services to be provided to the first client, and the second session managing server provides the service according to the conditions. For instance, see Japanese Patent Laid-open Publication No. 2004-172782 (referred to as "Document 2").

SUMMARY OF THE INVENTION

With the service control method as described in the Document 2, it is possible to provide a service appropriate for attribute information of the user (e.g., age, address, and the like).

In other words, upon receipt of an INVITE message from the first client via the first session managing server, the second session managing server obtains attribute information of the user who is using the first client, and provides a service appropriate for the attribute information.

With the service control method as described above, however, the user who logs in the first session managing server has to provide the attribute information to the second session managing server, even though the user is not logging in the second session managing server. If the user wants to use another service that logs in a third session managing server, it is also required to provide the attribute information to the third session managing server.

In other words, there is a problem that with the above service control method, a part or all of the user's attribute information may be broadly distributed.

There is another possibility that the second session managing server makes a wrong judgment regarding service-providing conditions, such as providing a service with a lower age limit to a user under that limit age. The first session managing server only performs a process to simply transfer an INVITE message or a response message, without knowing what kind of judgment is a basis for providing the service.

The present invention mainly features that a session managing server manages attribute information of a user using a client that is logging in this session managing server, or attribute information of a service operating on the client; conditions for establishing a communication session (hereinafter, referred to as "Session Establishment Policy (SEP)") are exchanged among multiple session managing servers; and the session managing server that manages the attribute information compares the attribute information with the SEP to make an access judgment whether or not the communication session is to be established, thereby preventing a copy of the attribute information from being distributed.

Therefore, the present invention includes an SEP providing means which provides an SEP, when the SEP is registered, updated, or deleted in the above individual managing servers, or when there is a request for the SEP from another session managing server.

Furthermore, in the present invention, the above session managing server includes a session managing server retrieving means and an SEP obtaining means. When the session managing server receives an INVITE message, the session managing server retrieving means retrieves a session managing server which a sending source client or a destination client of the INVITE message logs in, and the server obtaining means obtains an SEP from the session managing server that has been retrieved by the session managing server retrieving means.

In addition, the present invention mainly features that evidence indicating which session managing server has made access judgment based on what kind of SEP, is transmitted together with the above INVITE message or the above response message. Further, a session managing server which has not made the above access judgment checks the evidence so as to be aware in advance a basis for judgment on which other session managing servers try to provide a service, the session managing servers being related to the establishment of communication session.

Therefore, in the present invention, the session managing server is provided with an evidence adding means which adds the evidence to the INVITE message or the response message when the above access judgment has been made, and an evidence verifying means which verifies the evidence when the INVITE message or the response message has the evidence being added.

The present invention produces an effect as the following; in a system involving multiple session managing servers to establish a communication session, it is possible to prevent a part or all of attribute information from being distributed.

Furthermore, the present invention produces an effect that it is possible to check what kind of judgment is a basis for providing a service by the session managing server which is related to establishing the communication session.

These and other benefits are described throughout the present specification. A further understanding of the nature and advantages of the invention may be realized by reference to the remaining portions of the specification and the attached drawings.

BRIEF DESCRIPTION OF DRAWINGS

FIG. 2 illustrates a hardware configuration example showing each of user terminal 10, server device 20, session managing device 30, attribute information managing device 40.

FIG. 3 illustrates a configuration of SEP DB 310.

FIG. 4A and FIG. 4B illustrate configurations of attribute information DB 410.

FIG. 5 illustrates a configuration of registrar DB 309.

FIG. 13 illustrates a configuration of evidence-added INVITE message 53.

FIG. 14 illustrates a configuration of evidence-added response message 54.

FIG. 15A, FIG. 15B, FIG. 15C, and FIG. 15D respectively illustrate configurations of SEP sending request message 60, SEP sending response message 61, SEP registration request message 62, and SEP deletion request messages 63.

FIG. 16A and FIG. 16B illustrate formats of evaluation request message 70 and judgment result 71, respectively.

DETAILED DESCRIPTION OF THE EMBODIMENTS

Hereinafter, preferred embodiments of the present invention will be explained with reference to the accompanying drawings. It is to be noted that these embodiments described below will not limit the scope of the invention.

An example will be described below in which the present invention is applied to SIP. However, other than the SIP, the present invention is also applicable to a system which sends and receives an INVITE message and a response message via a session managing server, when a communication session is established.

Embodiment 1

An example of the SIP communication system to which the present invention is applied will be explained.

Figure 1:
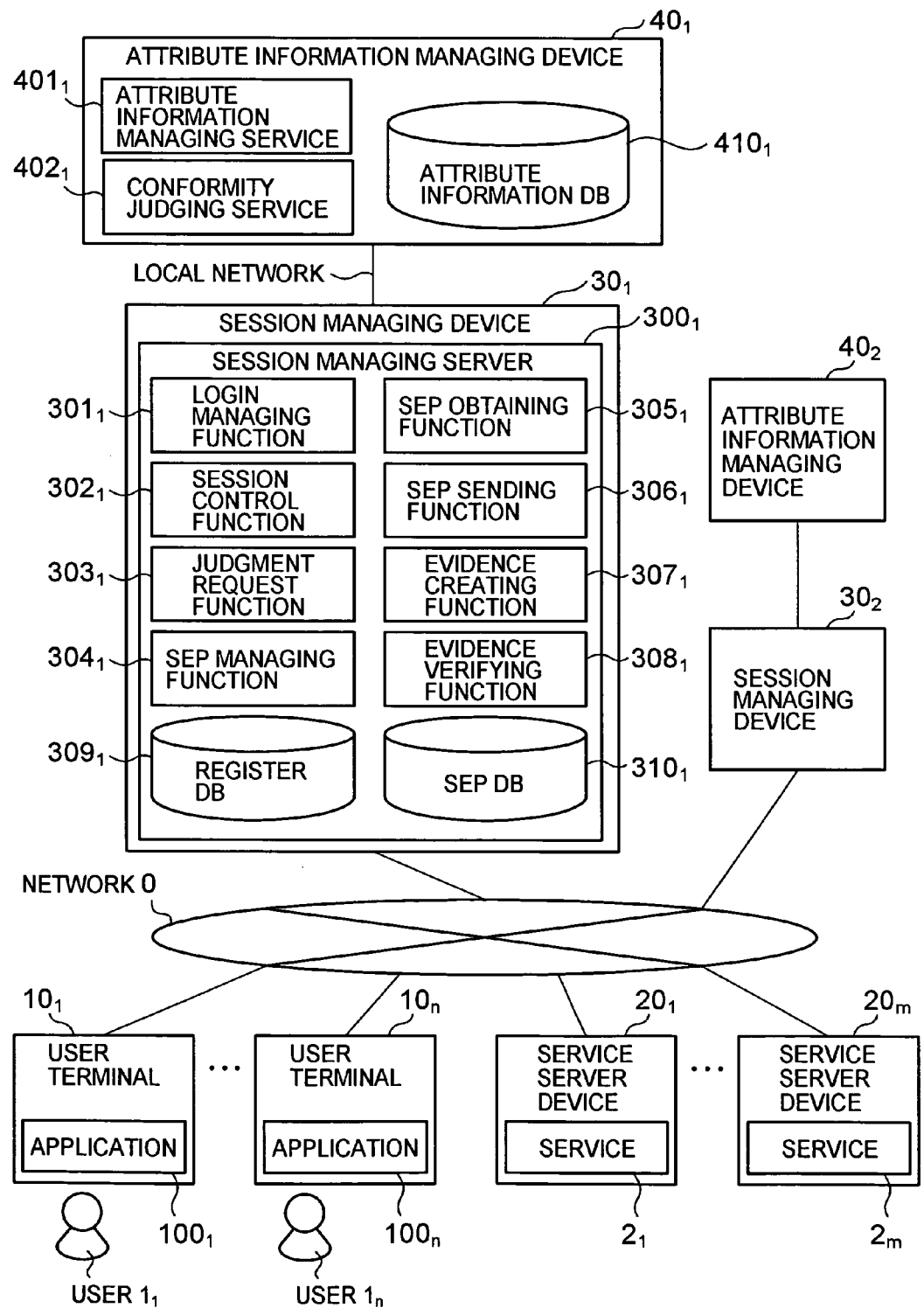
FIG. 1 illustrates a system configuration of SIP communication system to which the present invention is applied.

FIG. 1 is a diagram showing a system configuration of the SIP communication system to which the present invention is applied.

The SIP communication system according to the present embodiment is provided with n units of user terminal device (referred to as "user terminal") 10, m units of service server device (hereinafter, referred to as "server device") 20, and two units of session managing device 30 are connected with one another via the network 0, and further, each of the session managing devices 30 is provided with an attribute information managing device 40 which is connected via a local network. In the following description, if there exist multiple terminals, humans, functions, and the like, and it is necessary to specify one unit thereof, it is represented by using a numerical subscript such as user terminal $10_1$ and user terminal $10_2$. The user terminal 10 is a device employed for user 1 to utilize the SIP communication system and a user application program is executed which allows the user terminal 10 to be operable as an entity on the user side. A process (entity) implemented by executing this application program will be referred to as "application 100" in the following.

The server device 20 is a server device to provide a service to the user 1 or the user terminal 10, and a service program to implement the entity (referred to as "service 2") on the side to provide the service is executed on the server device.

The session managing device 30 is a managing device to control a communication session between the user terminal 10 and the server device 20, and a program to implement a session managing server 300 is operated thereon.

In order to control the communication session between the application 100 and the service 2, the session managing server 300 implements a login managing function 301 which performs processing to allow the application 100 (or the service 2) to log in or log out, a session control function 302 which controls the communication session between the application 100 and the service 2, a judgment request function 303 which requests the attribute information managing device 40 to judge whether or not establishment of communication session is allowed at the time when the session control function 302 performs processing for establishing the communication session, an SEP managing function 304 to manage the SEP 6, an SEP obtaining function 305 to obtain an SEP from another session managing device 30, an SEP sending function 306 to send the SEP 6 to another session managing device 30, an evidence creating function 307 which creates an evidence indicating on what kind of SEP the access judgment has been made, according to a result of the judgment requested to the attribute information managing device 40, and an evidence verifying function 308 to verify the evidence that was created by another session managing device 30. Furthermore, the session managing server 300 manages a registrar DB 309 in which the login managing function 301 records an association between the SIP identifier and the IP address, and an SEP DB 310 in which the SEP managing function 304 records the SEP 6.

In the present embodiment, it is assumed that SIP-URI issued for the user 1 is used as SIP-URI to be registered in the session managing server 300 when the application 100 logs in. Therefore, login of the application 100 will also be referred to as login of the user 1.

Here, it is assumed that the service 2 does not log in the session managing server $300_1$, and the application 100 does not log in the session managing server $300_2$.

However, the present invention is not limited to the example above. For example, it is also possible to configure in such a manner that the application $100_1$ to the application $100_5$, and the service $2_1$ to the service $2_5$ log in the session managing device $30_1$, and the application $100_6$ to the application $100_n$ and the service $2_6$ to the service $2_m$ log in the session managing device $30_2$. Furthermore, it is also possible that three or more session managing devices 30 are arranged and different applications 100 and services 2 may log in the respective session managing devices.

FIG. 5 is a diagram showing a structure of the registrar DB 309.

The registrar DB 309 as shown in FIG. 5 comprises SIP-URI field 3091 which records SIP-URI of the user 1, which is used as SIP-URI of the application 100, and SIP-URI of the service 2, IP address field 3092 which records an IP address that is allocated to a user terminal 10 used by the user 1 and the server device 20 on which the service 2 is operating, and an effective period field 3093 which records the effective period for the association between the SIP-URI and the IP address.

In the present embodiments, the SIP-URI is represented as a character string concatenating a name of the user 1 or the service 2 with a name of the session managing server 300 (hereinafter, also referred to as "domain name") which the user 1 or the service 2 logs in, by using "@" therebetween, adding "sip:" on the top, which indicates that this character string is SIP-URI. For example, in the present embodiment, the user $1_1$ has a name "user 11", and the session managing device $30_1$ which the application $100_1$ used by the user 1 logs in, has a name "sip1.hitachi.jp". Therefore, the SIP-URI of the user 1 and the application $100_1$ is formed as "sip:user11@sip1.hitachi.jp". Similarly, the user 1 and the application $100_2$ form SIP-URI being "sip:user12@sip1.hitachi.jp", and the user 1 and the application $100_n$ form SIP-URI being "sip:user1n@sip1.hitachi.jp". In the same way, the service $2_1$ has a name of "service 21", and the session managing device $30_2$ which the service 21 logs in has a name of "sip2.hitachi.jp". Therefore, the name of SIP-URI of the service $2_1$ is formed as "sip:service21@sip2.hitachi.jp". In addition, SIP-URI of the service $2_2$ is formed as "sip:service22@sip2.hitachi.jp", and SIP-URI of service $2_m$ is formed as "sip:service2m@sip2.hitachi.jp".

FIG. 3 is an illustration showing a structure of the SEP DB 310.

The SEP DB 310 as shown in FIG. 3 comprises SIP-URI field 3101 to record SIP-URI of the user 1 or the service 2 in which SEP 6 is being set, and SEP field 3102 to record the SEP 6.

In FIG. 3, for example, the user $1_1$ having the SIP-URI of "sip:user11@sip1.hitachi.jp" is provided with the SEP 6 (SEP $6_{11}$) that is "recommended age >=18". Therefore, the user $1_1$ has a setting so that connection is permitted with the service 2 having an attribute that the recommended age is 18 years old or more. Similarly, the service 2₁ having the SIP-URI of "sip:service21@sip2.hitachi.jp" is provided with the SEP 6 (SEP 6₂₁) that "address=(Tokyo|Kanagawa|Saitama|Chiba) & age >=20 & age <30 & sex=male". Therefore, a setting is made so that the service 2₁ is allowed to accept a connection request from the user 1 having an attribute that a man whose address belongs to any one of Tokyo, Kanagawa, Saitama, and Chiba, and the age is 20 years old or more, and less than 30 years old. It is to be noted that if it is necessary to specify one particular SEP 6, the SEP 6 targeted for the user 11 is represented as SEP 6₁₁, and the SEP 6 targeted for the user 12 is represented as SEP 6₁₂, the SEP 6 targeted for the service 21 is represented as SEP 6₂₁, and the SEP 6 targeted for the service 22 is represented as SEP 6₂₂. In the present embodiment, it is assumed that permission for accepting a connection or a connection request means that enjoying a service and rendering a service are permitted.

The attribute information managing device 40 is a device which manages attribute information relating to the user 1 and service 2, and it is provided with programs to implement attribute information managing service 401 which performs registering, deleting, and updating the attribute information, and conformity judging service 402 which makes a judge requested from the session managing device 30, and attribute information DB 410 in which the attribute information managing service 401 records the attribute information of the user 1 and service 2.

FIG. 4A and FIG. 4B are illustrations each showing a structure of the attribute information DB 410.

In the present embodiment, the attribute information DB 410 includes a user attribute information table 411 which records attribute information of the user 1, and service attribute information table 412 which records attribute information of the service 2.

The user attribute information table 411 includes SIP-URI field 4110 which records SIP-URI of the user 1, name field 4111 which records a name of the user 1, address field 4112 which records an address of the user 1, age field 4113 which records age of the user 1, sex field 4114 which records sex of the user 1, and occupation field 4115 which records an occupation of the user 1, and the user attribute information table 411 manages all of above items as a set of information.

The service attribute information table 412 includes SIP-URI field 4120 which records SIP-URI of the service 2, name field 4121 which records a name of the service 2, recommended age field 4122 which records a recommended age of the user 1 who is allowed to use the service 2, violence field 4123 which records attribute information indicating whether or not a violent expression is included in the service 2, and sexual expression field 4124 which records attribute information indicating whether or not a sexual expression is included in the service 2, and the service attribute information table 412 manages all of above items as a set of information.

It is assumed here that in the present embodiment, the service attribute information table 412 of the attribute information DB 410₂ does not record the attribute information of the user 1 who is using the user terminal 10 logging in the session managing device 30₁, and the user attribute information table 411 of the attribute information DB 410₁ does not record the attribute information of the service 2 of the server device 20 which logs in the session managing device 30₂.

A configuration of the SIP communication system of the present embodiment has been explained in the foregoing descriptions.

An electric computer which is provided with, for example as shown in FIG. 2, CPU 91, memory 92, external storage 93 such as hard disk, reader 94 which reads information from a recording medium 99 with portability such as CD-ROM, communication device 95 which establishes connection with another device via a network or LAN, input device 96 such as a keyboard and mouse, output device 97 such as monitor and printer, interface 98 which conducts data sending and receiving among those elements above, and local network which connects various peripheral equipment. The CPU 91 executes an operating system (referred to as "OS") loaded on the memory 92, and further executes a predetermined program under the control of the OS, whereby, each function and each service of the user terminal 10, server device 20, session managing device 30, and attribute information managing device 40 as shown in FIG. 1 can be implemented.

In other words, the service 2, application 100, session managing server 300, attribute information managing service 401, and conformity judging service 402 can be implemented as a process by the CPU 91 which executes a predetermined program.

Furthermore, the registrar DB 309, SEP DB 301, and attribute information DB 403 can be implemented by the CPU 91 utilizing the memory 92 and external storage 93.

This predetermined program to implement above elements on the electric computer as described above may be installed via the reader 94 from a storage medium 99 which is available for the electric computer. Alternatively, it may be installed via the communication device 95 from another server by way of a communication medium available for the electric computer, such as network 0, or a carrier wave or a digital signal carried through the network 0.

In installing the program, it is possible to store the program once in the external storage 93, and then, it is loaded on the memory 92 therefrom, so as to be executed by the CPU 91. Alternatively, the program may be directly loaded on the memory 92 without stored in the external storage 93, and then executed by the CPU 91.

It is to be noted that the configuration of the present embodiment is not limited to the above example. For example, it is possible to configure so that the session managing device 30 is connected to the attribute information managing device 40 via the network 0. In the case above, the attribute information managing device 40 may be provided with a function of access restriction, which identifies a device accessing the attribute information managing device 40, and permits a connection only from a particular session managing device 30, or only a specific area of the user attribute information table 411 and the service attribute information table 412 is allowed to be accessed. With the configuration as described above, there is an effect that multiple session managing devices 30 are allowed to utilize one attribute information managing device 40. However, if the communication via the network 0 is vulnerable to tapping by a third person, it is desirable that the communication between the session managing device 30 and the attribute information managing device 40 is encrypted.

Furthermore, the session managing device 30 and the attribute information managing device 40 may be the same device.

In the present embodiment, when information to be described in the user attribute information table 411 is registered, updated, or deleted, the user 1 requests as such in writing or face-to-face communication, and an administrator of the attribute information managing device 40 modifies the user attribute information table 411. Similarly, when information to be described in the service attribute information table 412 is registered, updated, or deleted, a provider of the service 2 requests as such in writing or face-to-face communication and the service attribute information table 412 is modified. Here, when the administrator of the attribute information managing device 40 modifies the user attribute information table 411 and the service attribute information table 412, this modification is performed interactively through a procedure that the attribute information managing service 401 having received a command of the administrator from the input device 96 modifies the table, and displays a result on the output device 97.

However, the present invention is not limited to the above procedure. For example, it is also possible to send and receive a command and a result via the local network or communication device 95, instead of receiving a command from the input device 96 or outputting the result to the output device 97. With the configuration above, the administrator of the attribute information managing device 40 is given an advantage that he or she is allowed to update the attribute information remotely via the network 0. This configuration produces another advantage that it is not necessary to prepare the input device 96 and the output device 97.

Next, operations of the SIP communication system according to the present embodiment will be explained.

In the SIP communication system according to the present embodiment, an operation when the user 1 or the application 100 logs in the session managing server 300 (as explained above, referred to as "the application 100 logs in" in the following) and an operation when the service 2 logs in the session managing server 300 are the same as the operation of the system utilizing a normal SIP. Therefore, those operations will not be tediously explained. While the user 1 logs in the session managing server 300, registration, updating, and deletion of SEP are enabled, also allowing data communication with the service 2 having logged in the session managing server 300.

An operation of the SIP communication system according to the present embodiment will be explained with reference to the accompanying drawings, specifically the case where the user 1 registers or deletes SEP 6.

Figure 6:
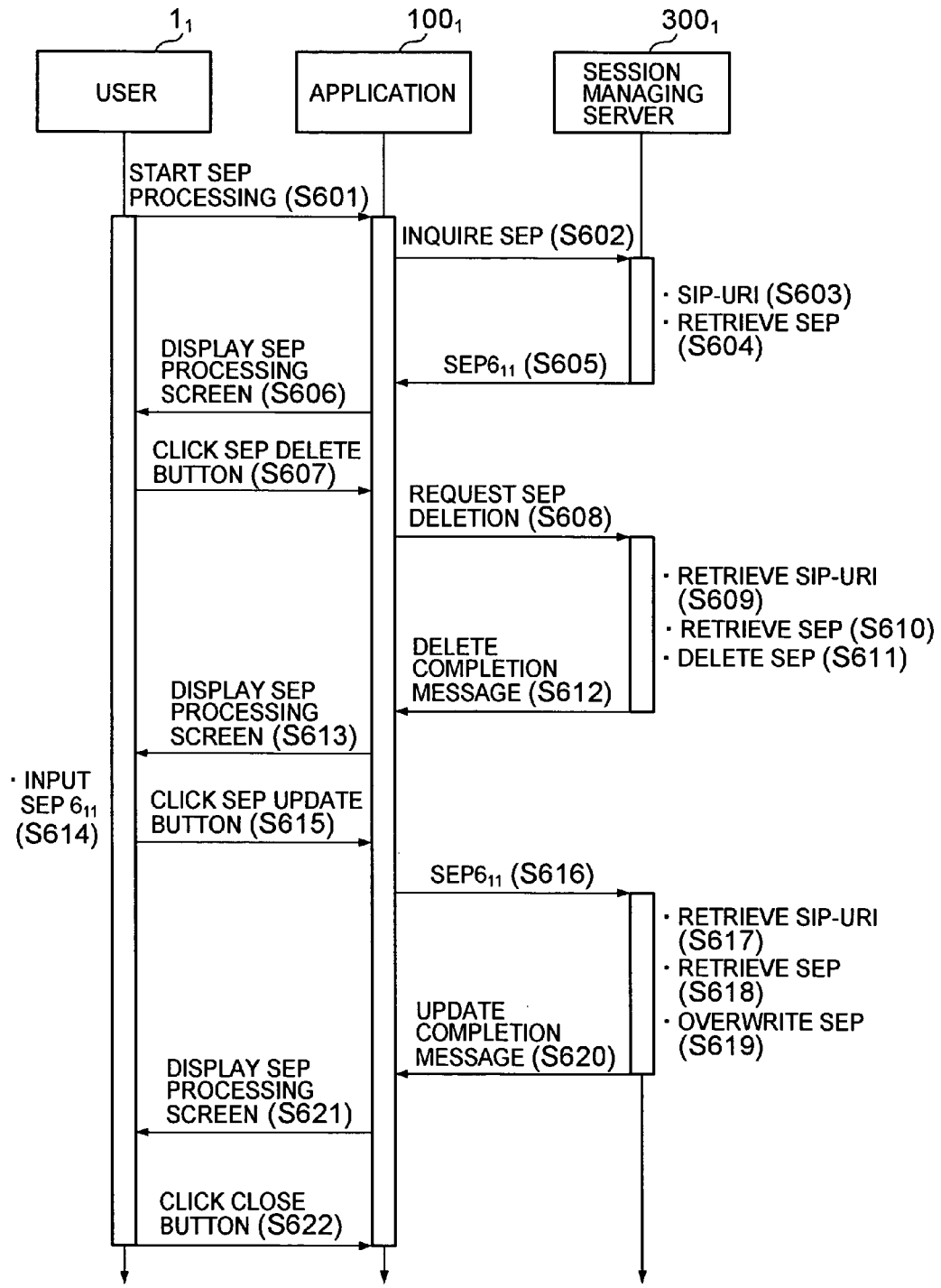
FIG. 6 illustrates operation sequence of deletion and registration of SEP 6.

FIG. 6 is a diagram which shows an operation sequence, when user $1_1$ deletes SEP $6_{11}$ managed on the session managing server $300_1$ and then registers a new SEP $6_{11}$.

Firstly, the user $1_1$ starts the application $100_1$ and logs in, then gives a directive to startup of SEP processing according to a predetermined operation (S601). The application $100_1$ that is given the directive to start the SEP process, makes an inquiry as to the SEP $6_{11}$ currently registered in the session managing server $300_1$ (S602). Then, SEP managing function $304_1$ of the session managing server $300_1$ searches the registrar DB $309_1$ using the sending source IP address of the SEP $6_{11}$ as a search key, and obtains SIP-URI of the user $1_1$ (S603). Next, the SEP managing function $304_1$ searches the SEP DB $310_1$ using this SIP-URI as a search key (S604), and sends the SEP $6_{11}$ to the application $100_1$ (S605).

Figure 7:
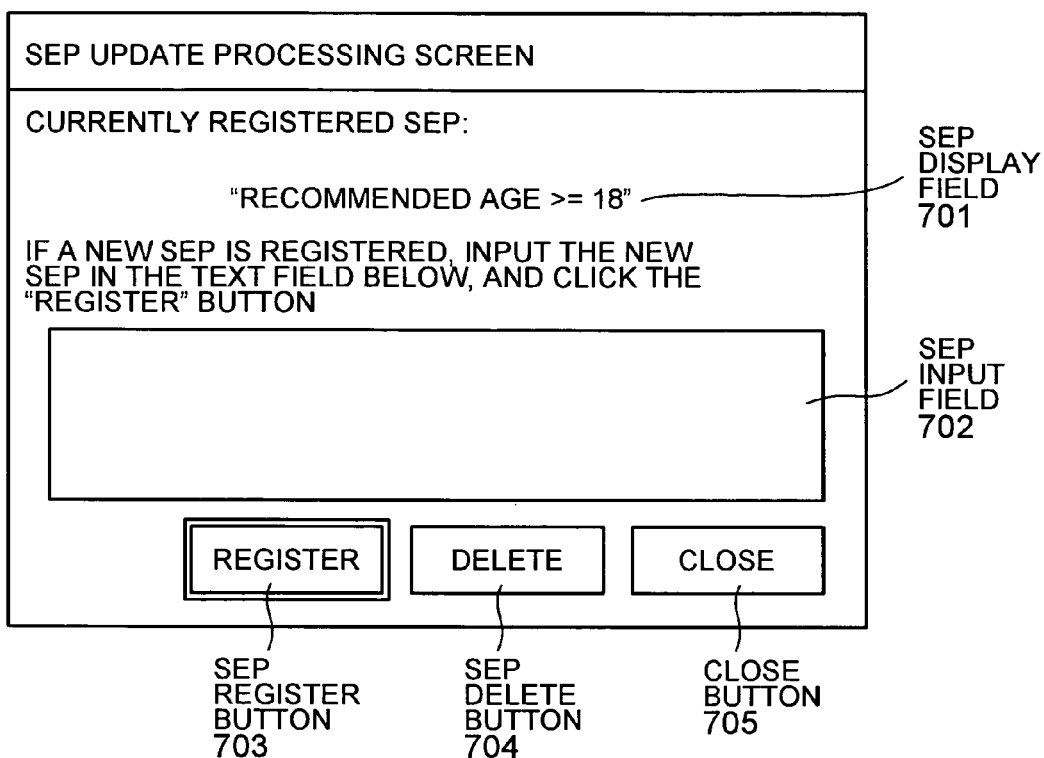
FIG. 7 illustrates an SEP processing screen.

The application $100_1$ which has received the SEP $6_{11}$ from the session managing server $300_1$ displays an SEP processing screen for the user, via the user terminal OS (S606). FIG. 7 is an example of the SEP processing screen.

The SEP processing screen as shown in FIG. 7 includes SEP display field 701 which displays the SEP 6 currently registered in the session managing device 30, SEP input field 702 to input a new SEP 6, SEP register button 703 which registers in the session managing device 30 the SEP 6 inputted in the SEP input field, SEP delete button 704 which deletes the SEP 6 which is registered in the session managing device 30, and close button 705 which closes the SEP processing screen.

When the user $1_1$ clicks the SEP delete button 704 to delete the SEP $6_{11}$ (S607), the application $100_1$ transmits an SEP deletes request to the session managing server $300_1$ (S608).

In the session managing server $300_1$ which has received the SEP delete request, the SEP managing function $304_1$ searches the registrar DB $309_1$ using the sending source IP address of this SEP delete request as a search key, and obtains SIP-URI of the user $1_1$ (S609). Next, the SEP managing function 304 searches the SEP DB $310_1$ using the SIP-URI as a search key (S610), deletes a value in the SEP field 3102 being associated with this SIP-URI (S611), and then returns a delete completion message to the application $100_1$ (S612).

The application $100_1$ which has received the delete completion message displays for the user $1_1$, the SEP processing screen with the SEP display field 701 being blank (S613).

Next, the user $1_1$ inputs data into the SEP input field 702 to register a new SEP $6_{11}$ (S614), and clicks the SEP register button 703 (S615).

The application $100_1$, which has detected that SEP register button 703 has been clicked, transmits the data inputted into the SEP input field to the session managing server $300_1$, assuming the data as SEP $6_{11}$ (S616).

In the session managing server $300_1$ which has received the SEP $6_{11}$, the SEP managing function $304_1$ searches the registrar DB $309_1$ using the sending source IP address of the SEP $6_{11}$ as a search key, and obtains the SIP-URI of the user 1, that is, the application $100_1$ (S617). Next, the SEP managing function $304_1$ searches the SEP DB $310_1$ using this SIP-URI as a search key (S618), overwrites with the SEP $6_{11}$ the SEP field 3102 being associated with the SIP-URI (S619), and then, returns the registration completion message to the application $100_1$ (S620).

The application $100_1$ which has received the registration completion message displays for the user $1_1$ the SEP processing screen, on which the SEP display field 701 has been updated with the above SEP $6_{11}$ (S621).

Next, when the user $1_1$ clicks the close button 705, the application $100_1$ finishes the SEP processing (S622).

Operations of the SIP communication system according to the present embodiment in the case where the user 1 registers or deletes an SEP 6 have been explained in the foregoing descriptions.

In the present embodiment, the user 1 by himself or herself performs registration or deletion of SEP 6 of the user 1 via the network 0, but the present invention is not limited to this example. For example, the registration or deletion may be performed by a third person who is authorized by the user 1 to perform the registration or deletion of the SEP 6 (referred to as "authorized person"). With this configuration above, it is possible for a guardian of the user 1 to set the SEP 6 for the user 1, and it produces an effect that information filtering by the guardian (Parental Control) can be implemented.

Alternatively, the user 1 or the above authorized person makes a request by writing or by phone to the administrator of the session managing device 30, so as to allow the administrator to register or delete the SEP 6 of the user 1. This configuration may produce an effect that even when the user or the authorized person is not aware of an accurate description method of the SEP 6, the SEP 6 can be set just by informing the administrator of details of the SEP 6 in a natural language.

It is to be noted that the operations of the system according to the present embodiment when a provider of the service 2 registers or deletes the SEP 6 of the service 2 are identical to the operations in the case where the user 1 registers or deletes the SEP 6, and thus tedious explanations will not be made.

Next, operations of the SIP communication system according to the present embodiment will be explained with reference to the accompanying drawings, specifically for the case in which the application 100 tries to establish a communication session with the service 2.

Figure 11:
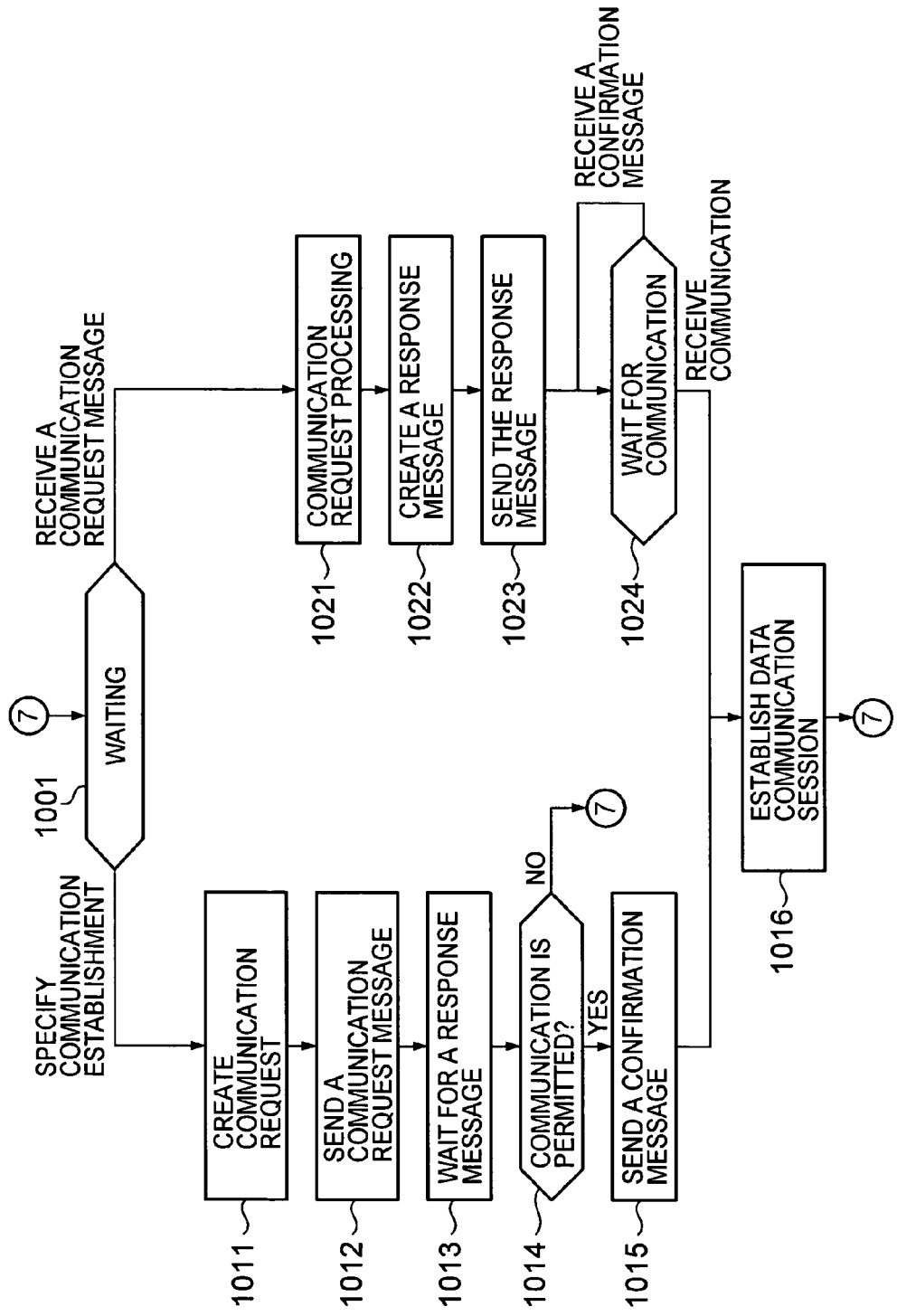
FIG. 11 illustrates operations of the application 100.

Firstly, with reference to FIG. 11, an operation of the application 100 will be explained.

Initially, when the application 100 is started, the application 100 waits for a directive of session establishment or data from the network 0 in step 1001.

At this timing, for example, if there is a directive to establish a session from the application 100 to the service $2_1$, the application 100 creates an INVITE message 50 to the service $2_1$ in step 1011, then transmits the INVITE message 50 to the session managing server 300 which the application 100 logs in (step 1012) and waits for a response message 51 from the session managing server 300 (step 1013).

When the application 100 receives the response message 51 from the session managing server 300, it analyzes the details of the response message, and checks whether or not the communication is permitted (step 1014).

If the communication is not permitted, the process returns to step 1001. If the communication is permitted, the application 100 transmits to the session managing server 300 a confirmation message 52 (step 1015), establishes the communication session with the service $2_1$, and then returns to step 1001.

Upon receipt of the INVITE message 50 from the network 0 in step 1001, the application 100 performs the INVITE processing such as setting the communication device so as to establish communication with the sending source of the INVITE message (step 1021), then creates a response message 51 (step 1022) and then transmits the response message 51 to the session managing server 300 (step 1023).

Next, the application 100 waits for data from the network 0 in step 1024.

Upon receipt of the confirmation message 52 from the session managing server 300, the processing just returns to step 1024. Upon receipt of communication from the sending source of the INVITE message 50, processing from step 1016 is carried out.

Operations of the application 100 have been explained in the foregoing description. It is to be noted that service 2 also performs similar operations as the application 100.

Since the formats of the INVITE message 50, response message 51, and confirmation message 52 are the same as a general SIP communication system, tedious explanations will not be made.

Next, with reference to FIG. 9 and FIG. 10, operations of the session managing server 300 will be explained, specifically for the case where the application 100 establishes a communication session with the service 2.

In the session managing server 300, the session control function 302 waits for a message from another session managing server 300, application 100, or service 2 (step 3001).

When the session managing server 300 receives an INVITE message 50 from another session managing servers 300 or application 100, the session control function 302 checks whether or not the domain name of the sending destination SIP-URI of the INVITE message 50 (indicating the SIP-URI described in the sending destination field, also referred to as "To header field") corresponds to the domain name of the session managing server 300 itself (step 3010).

When the domain name of the SIP-URI described in the sending destination field of the INVITE message 50 agrees with the domain name of the session managing server 300 itself, the session control function 302 requests the login managing function 302 to check whether or not the application 100 (or service 2) having the sending destination SIP-URI logs in (step 3030).

When the application 100 (or service 2) having the sending destination SIP-URI logs in, the session control function 302 requests the SEP managing function 304 to search the SEP DB 310 for an SEP 6 of the sending destination SIP-URI (step 3031).

Next, if an SEP 6 of the sending destination SIP-URI does not exist ("No" in step 3032), processing from step 3048 is executed.

If there exists an SEP 6 of the sending destination SIP-URI ("Yes" in step 3032), processing proceeds to step 3033. When the domain name of the SIP-URI (hereinafter referred to as "sending source SIP-URI") described in the sending source field (also referred to as "From header field") of the INVITE message 50 agrees with the domain name of the session managing server 300 itself, the session control function 302 requests the judgment request function 303 to make an inquiry to the conformity judging service 402, whether or not establishing of communication session is permitted. The judgment request function 303 transmits an evaluation request message 70 including the above SEP 6 and the above sending source SIP-URI, to the conformity judging service 402, obtains an judgment result 71 from the conformity judging service 402 (step 3034), and proceeds to step 3035.

FIG. 16 shows formats of the evaluation request message 70 and judgment result 71 according to the present embodiment. The evaluation request message 70 has a format including 4-byte SIP-URI length field 7011, variable length SIP-URI field 7012, 4-byte SEP length field 7013, and variable length SEP field 7014, and these fields are concatenated as a byte sequence. The SIP-URI length field 7011 stores a length of the SIP-URI field 7012, and the SIP-URI field 7012 stores SIP-URI that requests evaluation. In addition, the SEP length field 7013 stores a length of the SEP field 7014, and the SEP field 7014 stores SEP 6 which requests evaluation.

The judgment result 71 has a format including one-byte result code 7101, 4-byte evaluation request message length field 7111, and variable length evaluation request message field 7112, and these fields are concatenated as a byte sequence. The evaluation request message length field 7111 stores a length of the evaluation request message field 7112, and the evaluation request message field 7112 stores an evaluation request message 70 associated with this judgment result 71. In addition, the result code 7101 stores a result of evaluation of the evaluation request message 70, that is, "0" for the case where the attribute information of the SIP-URI included in the above evaluation request message 70 satisfies the SEP 6 included in the above evaluation request message 70; "1" for the case where it is not satisfied; and "−1" for the case where an error occurs during the judgment. In the following, it is assumed that when the result code is "0", the conformity judging service 402 has determined to permit establishing a session, and when the result is other than "0", the conformity judging service 402 has determined that establishing the session is not permitted.

If the result received from the conformity judging service 402 indicates permitting of session establishment in step 3035, the session control function 302 executes processing from step 3048.

If in step 3035, the result received from the conformity judging service 402 indicates that session establishment is not permitted, the session control function 302 creates a response message rejecting the connection request (step 3036), and executes the processing from step 3057.

If the domain name of the sending source SIP-URI does not agree with the domain name of the session managing server 300 in step 3033, the session control function 302 determines that the access judgment has not been made properly against the INVITE message, and executes the processing from step 3036.

In addition, in step 3030, if the application 100 (or service 2) having the sending destination SIP-URI has not logged in, the processing from step 3036 is executed.

On the other hand, in step 3010, if the domain name of the sending destination SIP-URI does not agree with the domain name of the session managing server 300, the session control function 302 checks whether or not the domain name of the sending source SIP-URI of the INVITE message 50 agrees with the domain name of the session managing server 300 (step 3011). When there is no agreement between the domain names, the session control function 302 executes the processing from step 3048. When there is an agreement between the domain names, the session control function 302 checks whether or not the application 100 (or service 2) having the above sending source SIP-URI has already logged in.

If such application 100 or service 2 has already logged in, the session control function 302 requests the SEP obtaining function 305 to create an SEP sending request message 60 which requests for an SEP of the sending destination SIP-URI. When the SEP obtaining function 305 creates the SEP sending request message 60, the session control function 302 transmits the message thus created to the session managing server 300 having the domain name of the above sending destination SIP-URI (step 3013).

Next, when the session control function 302 receives the SEP sending response message 61, the SEP obtaining function 305 is requested to obtain the SEP 6 from the message. The SEP obtaining function 305 obtains the SEP 6 from the SEP sending response message 61 (step 3014).

It is to be noted that the format of the SEP sending request message 60 and the SEP sending response message 61 conforms to the format of SIP message.

FIG. 15A and FIG. 15B are illustrations respectively showing configurations of the SEP sending request message 60 and the SEP sending response message 61. The SEP sending request message 60 indicates that the session managing server $300_1$ has requested the session managing server $300_2$ to obtain an SEP $6_{21}$ of the service $2_1$, and the SEP sending response message 61 is a response to this SEP sending request message 60.

In the SEP sending request message 60 as shown in FIG. 15A, there is described a character string "GETSEP" on the first line, indicating that the message is an SEP sending request message 60. In the sending source field starting from the character string "From:", there is described information indicating a sending source of the message, for example, a domain name of the session managing server $300_1$. In the sending destination field starting from the character string "To:", there is described identification information of a counterpart to whom sending request of SEP 6 is made, for example, SIP-URI of the service $2_1$. Furthermore, in two lines starting from "Call-ID" and "CSeq" respectively, there are described information items to uniquely identify the SEP sending request message 60.

In the SEP sending response message 61 as shown in FIG. 15B, there is described a character string "200 OK" on the first line, indicating that this message is a response message to something, and there are described the same information items as the above SEP sending request message on the two lines respectively starting from "Call-ID" and "CSeq". Therefore, it is indicated that this message is a response to the above SEP sending request message 60. The sending source field starting from "From:" includes information indicating whose SEP 6 is described by this message, that is, SIP-URI of the service $2_1$. The sending destination field starting from "To:" includes a domain name of the session managing server $300_1$ as a partner for sending. In addition, SEP $6_{21}$ is described in an area interposed between two character strings "<SEP>" and "</SEP>".

Next, the session control function 302 requests the judgment request function 303 to make an inquiry against the conformity judging service 402 to determine whether or not establishment of the communication session is permitted. At this timing, the judgment request function 303 transmits to the conformity judging service 402 an evaluation request message 70 including the SEP 6 and the sending source SIP-URI, and obtains a judgment result 71 from the conformity judging service 402 (step 3015). If the result received from the conformity judging service 402 indicates that the session establishment is not permitted, processing from step 3036 is executed. If the result received from the conformity judging service 402 in step 3016 indicates that the session establishment is permitted, the judgment request function 303 creates evidence data 80 indicating what kind of judgment has been made (step 3017).

In the present embodiment, the evidence data 80 is to be created by the judgment request function 303, but the present invention is not limited thereto. The evidence data 80 may be created by the session control function 302, or may be created by the conformity judging service 402 and returned to the judgment request function 303.

Next, the session control function 302 requests the SEP managing function 304 to retrieve an SEP 6 of the above sending source SIP-URI. The SEP managing function 304 searches the SEP DB 310 for the SEP 6, and gives a response to the session control function 302 (step 3018). In step 3019, the session control function 302 adds to the above INVITE message 50, the SEP 6 of the sending source SIP-URI obtained from the SEP managing function 304 and the evidence data 80, and creates an evidence-added INVITE message 53.

FIG. 13 is an illustration showing a configuration of the evidence-added INVITE message 53. The SEP $6_{11}$ of the application $100_1$, and the evidence data 80 having judged whether or not the application $100_1$ satisfies the SEP $6_{21}$ of the service $2_1$ are added to the body part of the INVITE message 50 from the application $100_1$ to the service $2_1$. The SEP $6_{11}$ of the application $100_1$ is described in the area interposed between two character strings of "<SEP>" and "</SEP>". In a similar manner, the evidence data 80 is described in the area interposed between two character strings of "<PROOF>" and "</PROOF>".

It is to be noted here that in the evidence data 80 as shown in FIG. 13, there is described a character string indicating that the application $100_1$ satisfies the SEP $6_{21}$ in the area interposed between "<STATEMENT>" and "</STATEMENT>". In the area interposed between two strings "<VerifiedBy>" and "</VerifiedBy>", there is described a name of the session managing server 300 that has made the above verification, that is, the name of the session managing server $300_1$. Furthermore, in the area interposed between the two character strings "<SIGNATURE>" and "</SIGNATURE>", there is described an electronic signature data which has been made by the session managing server $300_1$ for the area from "<STATEMENT>" to "</VerifiedBy>".

Next, in step 3020, the session control function 302 transmits the evidence-added INVITE message 53 to the session managing server 300 having the domain name of the sending destination SIP-URI, and then the session control function 302 executes processing from step 3050.

On the other hand, in step 3001, when the session control function 302 receives an evidence-added INVITE message 53 from another session managing server 300 or application 100, the session control function 302 shifts the processing to step 3041 and checks whether or not the domain name of the sending destination SIP-URI of the message agrees with the domain name of its own session managing server 300.

If there is no agreement between the domain names, the session control function 302 executes the processing from step 3048, and if there is an agreement between the domain names, it checks in step 3042 whether or not the application 100 (or server 2) having the sending destination SIP-URI of the evidence-added INVITE message 53 has already logged in.

Here, if such application 100 or service 2 has not logged in yet, the session control function 302 executes the processing from step 3036, whereas if it has already logged in, it requests the judgment request function 303 to make an inquiry to the conformity judging service 402 as to whether or not the session establishment is permitted. At this stage, the judgment request function 303 transmits an evaluation request message 70 including the SEP 6 attached to the evidence-added INVITE message 53 and the above sending destination SIP-URI, to the conformity judging service 402, obtains a judgment result 71 from the conformity judging service 402 (step 3043), and proceeds to step 3044.

If the result received from the conformity judging service 402 in step 3044 indicates that the session establishment is not permitted, the session control function 302 executes the processing from step 3036. On the other hand, if the result indicates that the session establishment is permitted, the session control function 302 verifies the evidence data 80 which is attached to the evidence-added message 54 in step 3045. In other words, it is checked by verifying the electronic signature, whether or not the author of the evidence data 80 is reliable, and the evidence data 80 has not been tampered.

If the session control function 302 fails in verifying the electronic signature, the processing from step 3036 is executed. If the verification of the electronic signature is successfully completed, the added SEP 6 and the evidence data 80 are removed from the above evidence-added INVITE message 53, and an INVITE message 50 is created (step 3047).

Next, the session control function 302 searches the registrar DB 309 for an IP address which is associated with the above sending destination SIP-URI (step 3048), and transmits the INVITE message 50 to the device having this IP address (step 3049), and then waits for a response message (step 3050).

Upon receipt of the response message in step 3051, the session control function 302 checks whether or not this response message is an evidence-added response message 54 in step 3052.

The evidence-added response message 54 according to the present embodiment is a message to which the evidence data 80 is added in the area interposed between two character strings "<PROOF>" and "</PROOF>" in the body part of the response message 51, and it is possible to determine whether or not the message is an evidence-added response message 54 by checking the body part of the response message.

FIG. 14 is an illustration showing a configuration of the evidence-added response message 54 according to the present embodiment.

In step 3052, if the message is a response message 51 in step 3052, processing from step 3057 is executed, and if it is an evidence-added response message 54, the evidence data 80 added to the message is validated, to verify whether a proper access judgment has been made. In other words, it is checked by verifying the electronic signature, whether or not the author of the evidence data 80 is reliable and the evidence data 80 has not been tampered (step 3053).

Next, if the above verification fails in step 3054, the processing from step 3056 is executed. If the above verification is successfully performed, it is checked whether or not there exists evidence data 80 to be added to the response message 51 in step 3055.

In step 3055, if there is evidence data 80 to be added, an evidence-added response message 54 is created by adding the evidence data 80 to the above response message (step 3056).

In step 3057, it is checked whether or not the domain name of the sending destination SIP-URI of the response message agrees with the domain name of its own session managing server 300. If there is an agreement therebetween, processing is shifted to step 3058, and if the above response message is an evidence-added response message 54, the evidence data 80 is deleted from the evidence-added response message 54, and a response message 51 is created.

Next, the registrar DB 309 is searched for an IP address being associated to the above sending destination SIP-URI (step 3059), the response message 51 is transmitted to the device having this IP address (step 3060), and then, processing returns to step 3001.

If there is no agreement between the domain names in step 3057, the response message is transmitted to the session managing server 300 having the domain name of the sending destination SIP-URI in step 3060, and processing returns to step 3001.

In step 3001, if a confirmation message 52 is received from another session managing server 300 or application 100, this confirmation message 52 is regarded as a response message 51. Then, proceeding to step 3057 next, the session control function 302 executes the subsequent processing.

On the other hand, in step 3001, upon receipt of an SEP sending request message 60 from another session managing server 300 or application 100, the next step is step 3021, and the SEP sending function 306 searches the SEP DB 310 for an SEP 6 of the sending destination SIP-URI described in the SEP sending request message 60.

Next, in step 3022, after the SEP sending function 306 creates an SEP sending response message 61 including the above SEP 6, a response is returned to the sending source of the above SEP sending request message 60, and processing returns to step 3001.

If there does not exist the SEP 6 of the sending destination SIP-URI in the SEP DB 310 in step 3021, the SEP 6 is treated as a blank character string in the present embodiment. At this stage, in step 3022, instead of interposing the SEP 6 between the two character strings "<SEP>" and "</SEP>" of the SEP sending response message 61, description of "<SEP/>" is used.

Operations of the session managing server 300 in the case where the application 100 establishes a communication session with the service 2 have been explained in the foregoing description.

Figure 12:
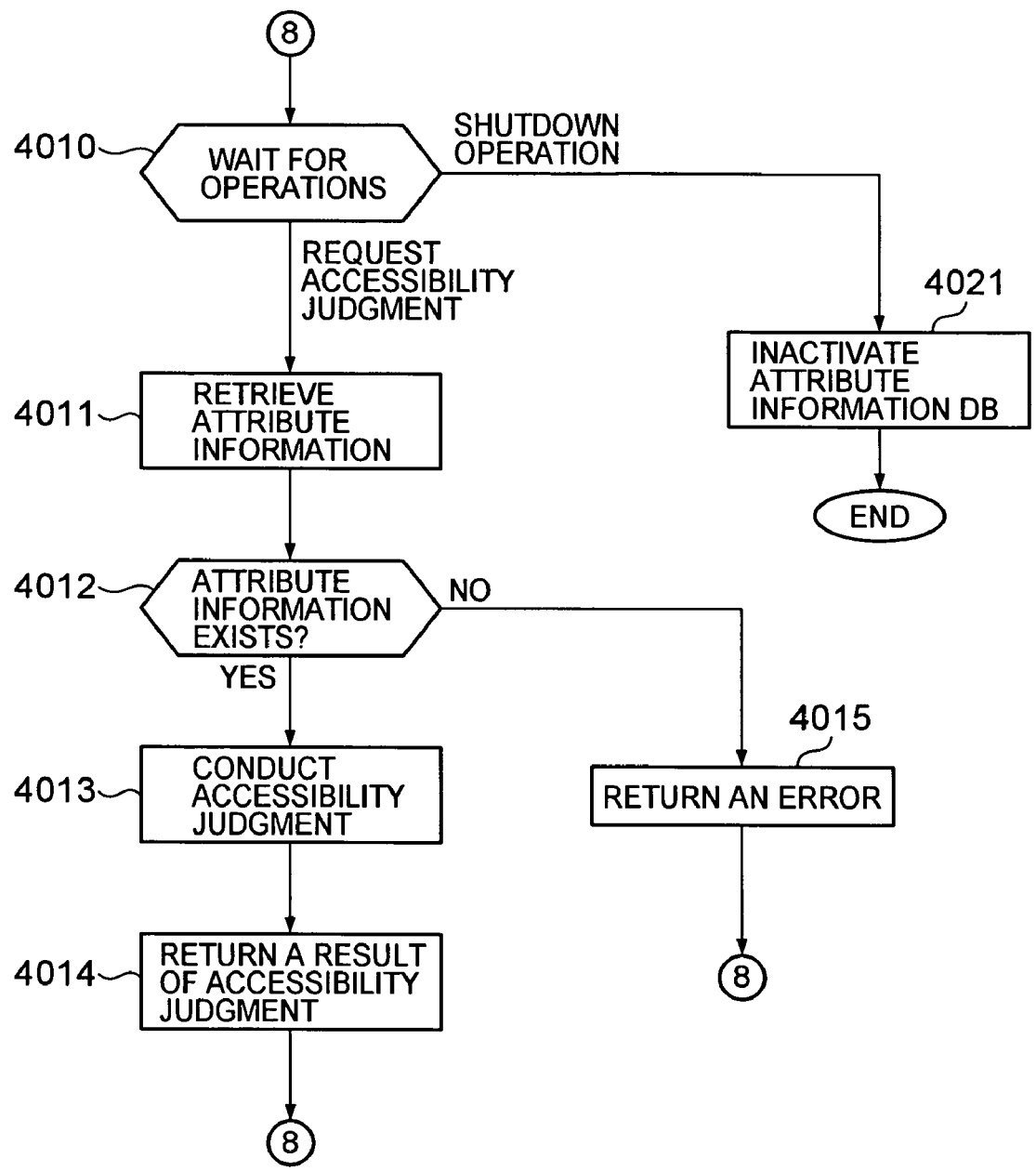
FIG. 12 illustrates operations of the conformity judging service 402.

Next, with reference to FIG. 12, operations of the conformity judging service 402 will be explained, specifically for the case where it is requested to make a judgment from the session managing server 300.

When a processing starts, the conformity judging service 402 waits for an operation from the session managing server 300 or from an administrator (step 4010). Here, when the administrator conducts a shutdown operation, the attribute information DB 410 is inactivated in step 4021 and the processing is terminated. In step 4010, if an evaluation request message 70 is received from the session managing server 300, the conformity judging service 402 retrieves SIP-URI and SEP 6 included in the evaluation request message 70, and searches the attribute information DB 410 for the attribute information of the SIP-URI.

If there does not exist attribute information of the above SIP-URI (No in step 4012), the conformity judging service 402 gives a response as a judgment result 71 to the session managing server 300, indicating that an error has occurred, and then processing returns to step 4010.

If there exists attribute information of the above SIP-URI (Yes in step 4012), the conformity judging service 402 determines whether or not the attribute information satisfies the above SEP 6 (step 4013). If the SEP 6 is a blank character string, it is determined that the attribute information satisfies the SEP 6 at any time.

Next, the conformity judging service 402 returns a result of the step 4013 to the session managing server 300, as a judgment result 71 (step 4014), and gets back to step 4010.

Operations of the conformity judging service 402 have been explained in the foregoing description in the case where it is requested to make judgment from the session managing server 300.

If a communication session is to be established between the application 100 and the service 2, the application $100_1$, the service 2, the session managing server 300, and the conformity judging service 402 conduct the above operations to send and receive various messages, thereby establishing the communication session.

Figure 8:
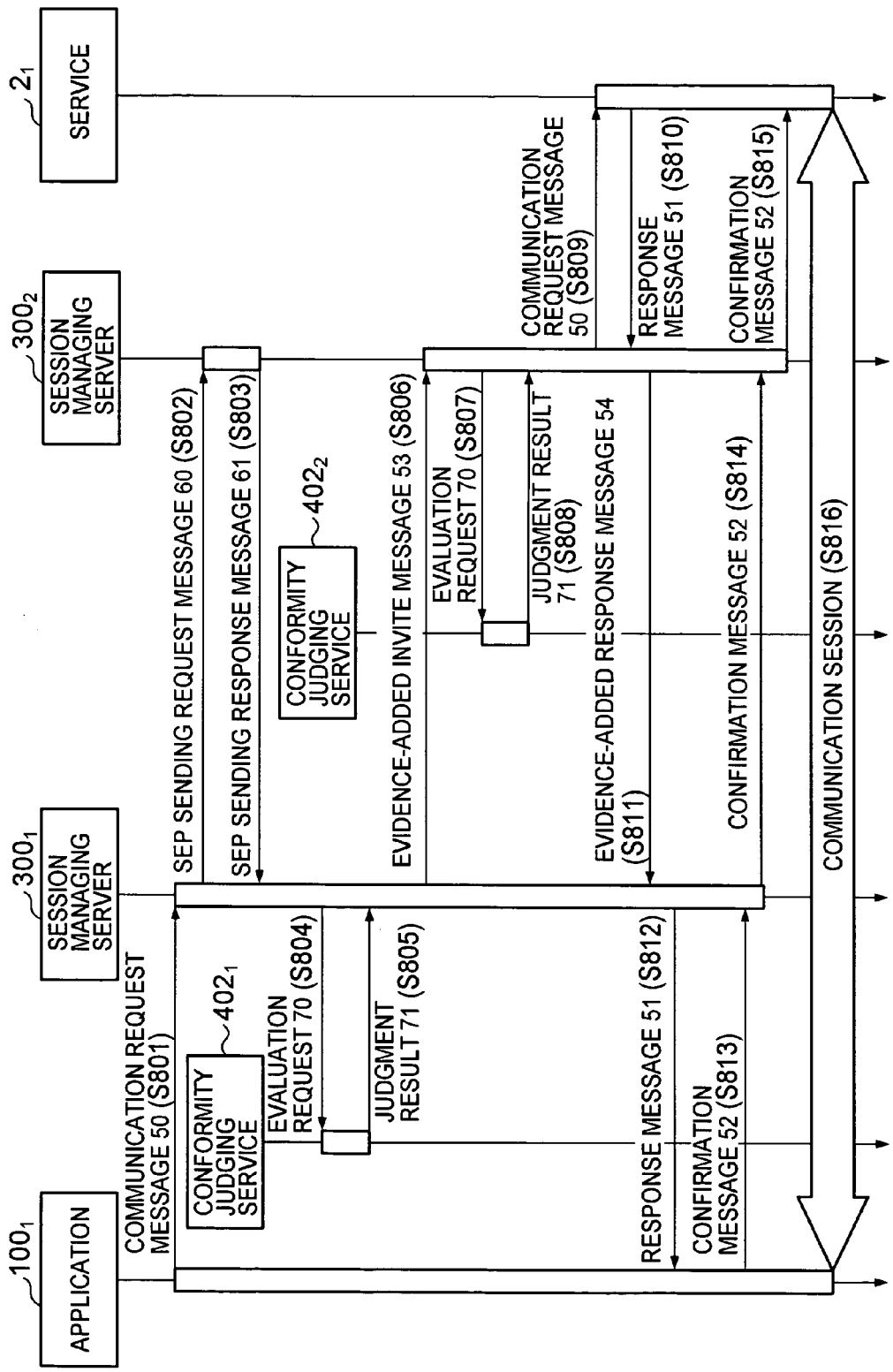
FIG. 8 illustrates a sequence of messages sent and received among devices when the application 100 establishes a communication session with the service 2.

With reference to FIG. 8, sending and receiving of the above messages will be explained, in the case where a communication session is established between the application and the service which are permitted to establish the communication session (application $100_1$ and service $2_1$).

At first, when the user $1_1$ gives a directive to the application $100_1$ to establish connection with the service $2_1$, the application $100_1$ transmits an INVITE message 50 to the session managing server $300_1$ in step 1012 (S801).

The session managing server $300_1$ which has received the INVITE message 50 sends an SEP sending request message 60 requesting an SEP $6_{21}$ from the session managing server $300_2$ which the service $2_1$ logs in step 3014 (S802).

Figure 9:
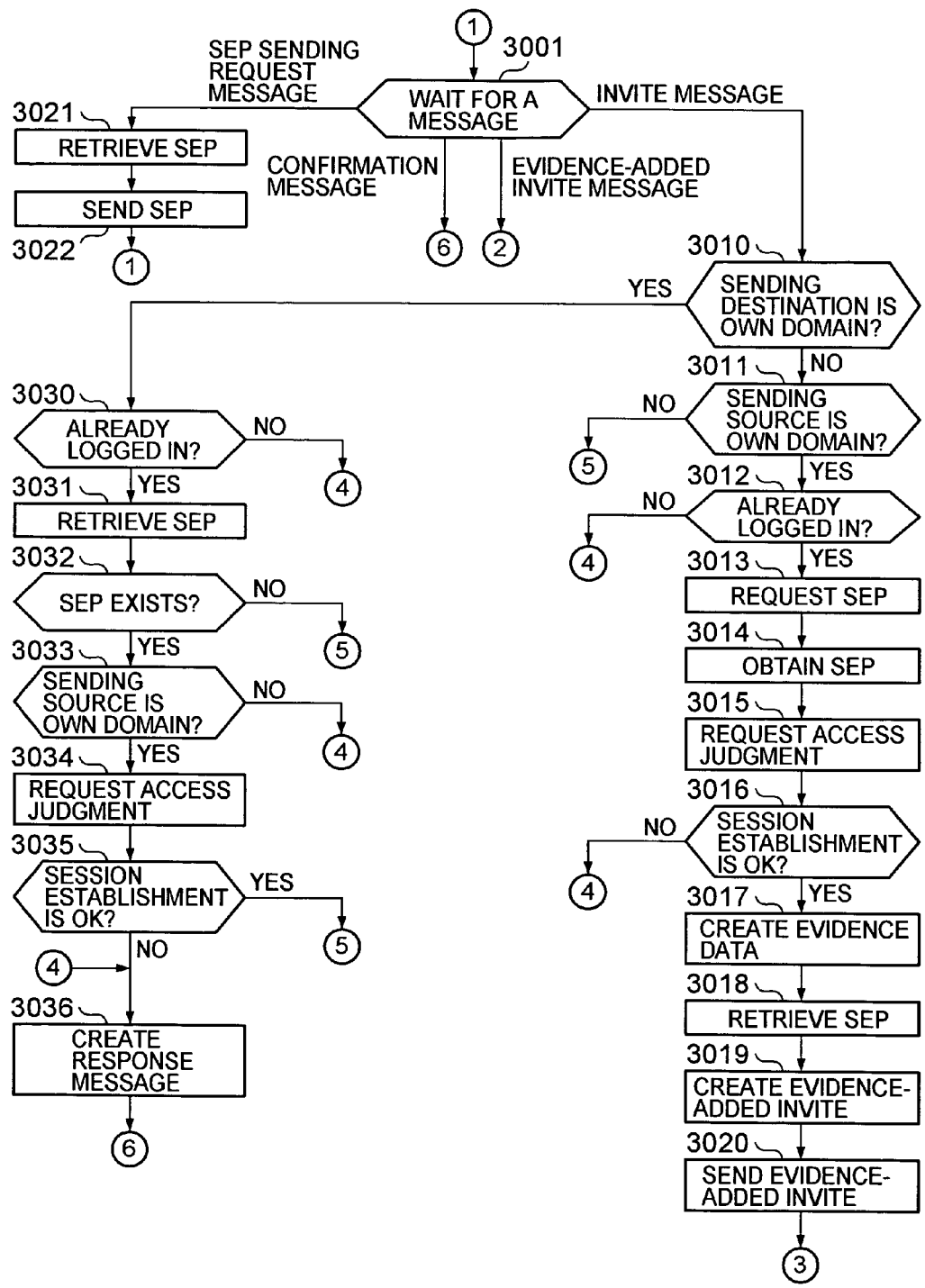
FIG. 9 illustrates operations of the session managing server 300 when the application 100 establishes a communication session with the service 2.
Figure 10:
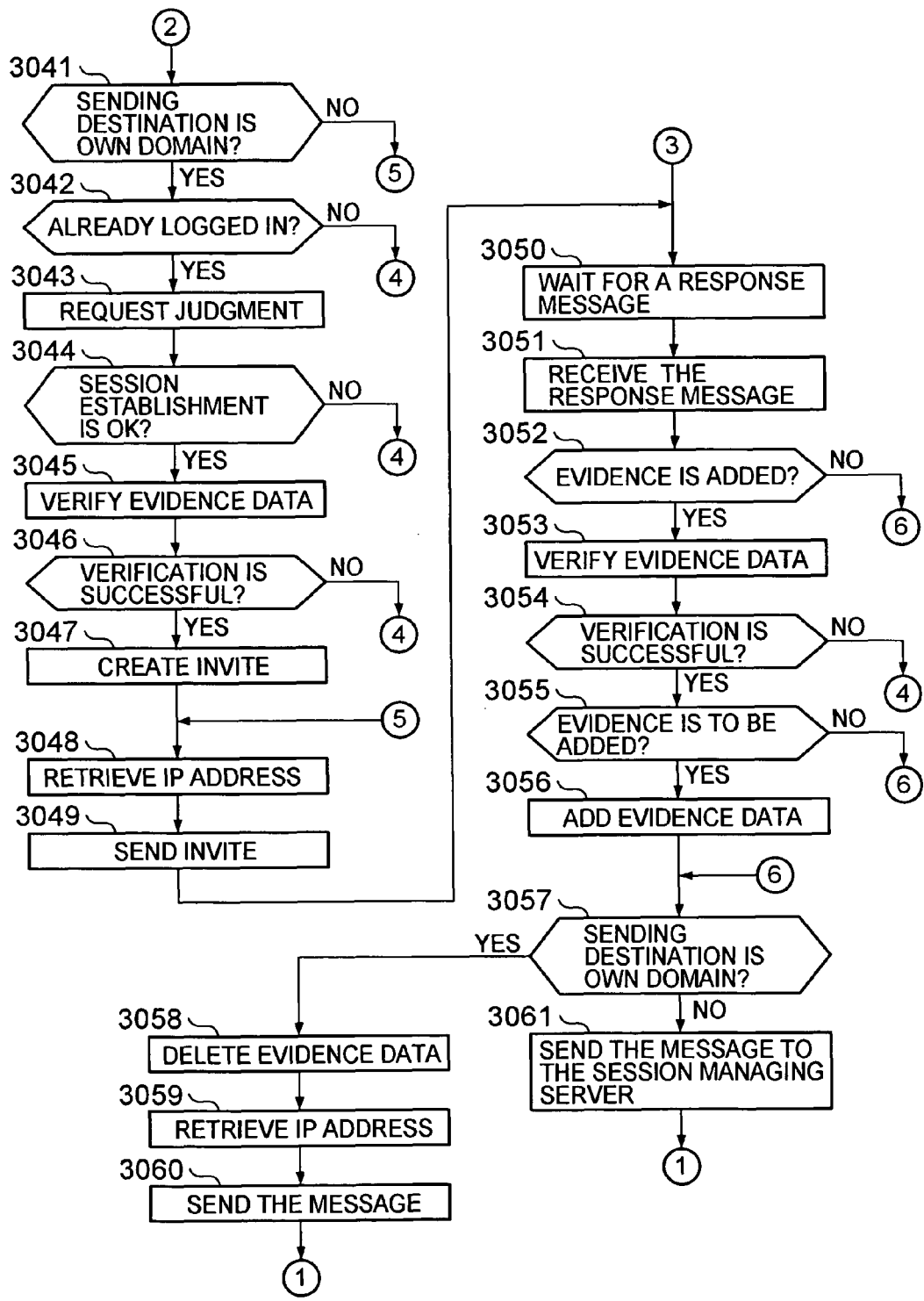
FIG. 10 illustrates operations of the session managing server 300 when the application 100 establishes a communication session with the service 2.

The session managing server $300_2$ returns the SEP sending response message 61 including the SEP $6_{21}$ to the session managing server $300_1$ (S3022 in FIG. 9 and S803).

The session managing server $300_1$, which has received the SEP sending response message 61 including the SEP $6_{21}$ from the session managing server $300_2$, sends to the conformity judging service $400_1$, an evaluation request message 70 including the SIP-URI of the application $100_1$ and the SEP $6_{21}$ in step 3015 (S3015 in FIG. 9 and S804).

The conformity judging service $400_1$ having received the evaluation request message 70 evaluates whether or not the attribute information of the application $100_1$ satisfies the SEP $6_{21}$ (that is, having attribute of "a male ages from 20 under 30, living in address of any one of the following; Tokyo, Kanagawa, Saitama, and Chiba". Then, in step 4014, the conformity judging service $400_1$ returns to the session managing server $300_1$, a judgment result 71, that is, "the attribute information of the application $100_1$ satisfies the SEP $6_{21}$" (step 3016 and S805).

From step 3017 to step 3019, the session managing server $300_1$ creates an evidence-added INVITE message 53 including the evidence data 80 generated from the judgment result 71, and the SEP $6_{11}$ of the application $100_1$, and transmits thus created message to the session managing server $300_2$ in step 3020 (S806).

The session managing server $300_2$ which has received the evidence-added INVITE message 53 sends to the conformity judging service $400_2$ an evaluation request message 70 including the SIP-URI of the service $2_1$ and the SEP $6_{11}$ in step 3043 (S807).

From step 4011 to step 4013, the conformity judging service $400_2$ which has received the evaluation request message 70, makes evaluations whether or not the attribute information of the service $2_1$ satisfies the SEP $6_{11}$, and returns a judgment result 71 to the session managing server $300_1$ in step 4014 (S808).

If the judgment result 71 indicates that "the attribute information of the service $2_1$ satisfies the SEP $6_{11}$", the session managing server $300_2$ verifies the evidence data 80 attached to the above evidence-added INVITE message 53 in step 3045 and 3046.

In step 3047, the session managing server $300_2$ creates an INVITE message 50 from the evidence-added INVITE message 53, and transmits the created message to the service $2_1$ in step 3049 (S809). When the service $2_1$ having received the INVITE message 50 transmits the response message 51 to the session managing server $300_2$ in step 1023 (S810), the session managing server $300_2$ creates an evidence-added response message 54 in step 3051 to step 3056, and transmits the created message to the session managing server $300_1$ (S811).

When the session managing server $300_1$ verifies the evidence data 80 attached to the evidence-added response message 54 in step 3050 to step 3054, the session managing server $300_1$ deletes the evidence data 80 from the above evidence added response message 54 in step 3058, and transmits the response message 51 to the application $100_1$ in step 3060 (S812).

Upon receipt of the response message 51 in step 1013, the application $100_1$ transmits a confirmation message 52 to the session managing server $300_1$ in step 1015 (S813). The session managing server $300_1$ that has received the confirmation message 52 transmits the confirmation message 52 to the session managing server $300_2$ in step 3061, and then the session managing server $300_2$ also transmits this confirmation message 52 to the service $2_1$ in step 3060 (S815).

Next, a communication session is established between the application $100_1$ and the service $2_1$. Specifically, TCP connection is established between the application $100_1$ and the service $2_1$, and application data is sent and received between the application $100_1$ and the service $2_1$ (S 816).

With the foregoing descriptions, there has been explained a sequence of messages sent and received in the SIP communication system according to the present embodiment, in the case where the application $100_1$ establishes communication session with the service $2_1$.

When the service 2 establishes a communication session with the application 100, it is also possible to establish the communication session in the same manner as described above.

In the system according to the present embodiment, if the session managing server 300 receives an INVITE message 50 having the sending source SIP-URI domain name agreeing with the domain name of the session managing server 300 itself, and the sending destination SIP-URI domain name does not agree with the domain name of the session managing server 300, an SEP 6 of the application 100 (or service 2) associated with the above sending destination SIP-URI is obtained from the session managing server 300 having the domain name of the sending destination SIP-URI. Instead of the above INVITE message 50, an evidence-added INVITE message 53 is transmitted, which is obtained by adding the SEP 6 of the application 100 (or service 2) associated with the above sending source SIP-URI to the INVITE message 50, to the session managing server 300 having the domain name of the above sending destination SIP-URI. In addition, the attribute information managing device 40 manages the attribute information, and access judgment is made by this attribute information managing device 40. Therefore, according to the system of the present embodiment, there is produced an effect that the access judgment can be carried out without distributing the attribute information.

In the system of the present embodiment, the session managing server 300 transmits the evidence data 80 showing an evidence of the access judgment together with the INVITE message 50 or the response message 51, in a form of evidence-added INVITE message 53 or evidence-added response message 54. Therefore, there is an effect that it is possible to verify what kind of access judgment has been made in the session managing server 300 which has not actually made the access judgment, and there is also an effect that the number of messages sent and received can be reduced, compared to the case where the evidence data 80 is transmitted separately.

Furthermore, the evidence-added INVITE message 53 and the evidence-added response message 54 store the SEP 6 and the evidence data 80 in the body part of the INVITE message 50 or in the response message 51. Therefore, it produces an effect that even when an SIP server to which the present embodiment is not applied relays the message, occurrence of error may be avoided.

However, the present invention is not limited to the case above. For example, the session managing server 300 may use a new message which is obtained by concatenating the SEP 6 or the evidence data 80 with the INVITE message 50 or the response message 51 in a form of byte sequence. Alternatively, the SEP 6 or the evidence data 80 may be provided with an area to store the INVITE message 50 or the response message 51, and the SEP 6 or the evidence data 80 storing the INVITE message 50 or the response message 51 in the area may be transmitted.

In the system according to the present embodiment, the session managing server 300 obtains an SEP 6, which is not managed by its own server, at the time of access judgment. Therefore, the session managing server 300 is only required to manage an SEP 6 of the application 100 or the server 2 which logs in the session managing server 300. Therefore, the size of the SEP DB 310 can be made small.

In the system according to the present embodiment, the attribute information managing device 40 is designed to display and update the attribute information of the application 100 or the service 2, and it is possible to obtain a result of the conformity judgment whether or not a certain condition is satisfied, by accessing the attribute information managing device 40 via a local network. Therefore, there is an effect that a drain via the network of the attribute information of the application 100 or the service 2 can be prevented.

In the system according to the present embodiment, the session managing server 300 manages the SEP 6, and in order to determine from which session managing server 300 the SEP 6 should be obtained, the same judging method (algorithm) is used as the method in which the session managing server 300 decides a sending destination of the SIP message. Therefore, there is an effect that a function to search out an administrator who is managing the SEP 6 is not necessary.

In the present embodiment, a message sent and received via the network 0 is transmitted in a form of plain text, but it is not limited to this. The message may be sent and received in such a manner as being ciphered, given an electronic signature, or using an encryption communication protocol. With this configuration, there is produced an effect that confidentiality and completeness of the message are made more reliable.

In addition, in the present embodiment, the registrar DB 309, SEP DB 310, and the attribute information DB 410 store the information in a form of plain text as it is, but it is not limited to this. The information may be subjected to a process such as encryption or applying electronic signature, prior to being stored. With this configuration, there is produced an effect that confidentiality and completeness of the information stored in the DB are made more reliable.

Furthermore, in the present embodiment, the message sent and received via the network 0 does not include information regarding the communication session between the application 100 and the service 2. However, it is not limited to this. For example, the above message may include a name of the protocol used in the above communication session, a name of an encryption algorithm or a digest algorithm, a key used in encrypting process or hash process, or a random number for calculating the key. With this configuration, there is produced an effect that it is possible to perform negotiations of communication parameters in the communication session between access-permitted application 100 and service 2.

In the present embodiment, when the user 1 establishes a communication session with the service 2, two types of judgment are made, that is, whether or not the attribute information of the user 1 satisfies the SEP 6 of the service 2, and whether or not the attribute information of the service 2 satisfies the SEP 6 of the user 1 (S805 and S808), but the present invention is not limited to this.

For example, it is also possible to decide whether or not the communication session is established, according to the judgment result whether or not the attribute information of the user 1 satisfies the SEP 6 of the service 2. With this configuration, the session managing server 300 which the service 2 is logging in is only required to verify the evidence, there is produced an effect that high speed processing can be achieved.

Furthermore, in the present embodiment, the session managing server 300 is provided with the SEP managing function 304, the SEP sending function 306, and the SEP DB 310. However, the present invention is not limited to this.

For example, an SEP managing process which is different from the session managing server 300 may be provided with the SEP managing function 304, the SEP sending function 306, and SEP DB 310, and the session managing server 300 may obtain an SEP 6 from the SEP managing process by the SEP obtaining function 305. Furthermore, the session managing server 300 and the SEP managing process may be operated on different devices respectively. With this configuration, there is produced an effect that it is not necessary for the session managing server 300 to change the procedure for obtaining the SEP 6 depending on whether or not the domain name of the SIP-URI which wants to obtain the SEP 6 agrees with the domain name of its own session managing server 300, and it is only required to change a counterpart to which the obtaining request is transmitted.

Furthermore, in the present embodiment, the SEP sending request message 60 and the SEP sending response message 61 use a format conforming to SIP message, but the present invention is not limited to this.

For example, a message in an original format may be employed. Alternatively, an SIP message such as an INFO message or a MESSAGE message may be used, and a command for requesting/responding to send, register, or delete the SEP may be described in the body part of the SIP message. With this configuration, there is produced an effect that an SEP can be obtained at a higher speed, or a session managing function 302 conforming to the SIP can be employed.

Embodiment 2

Next, a second example to which the present invention is applied will be explained.

In the system according to Example 2, the application 100 holds an SEP 6 of the application 100, and the service 2 holds an SEP 6 of the service 2. This point is different from Example 1.

Firstly, operations in the system of Example 2, in the case where the application 100 logs in and logs out will be explained with reference to the accompanying drawings.

Figure 17:
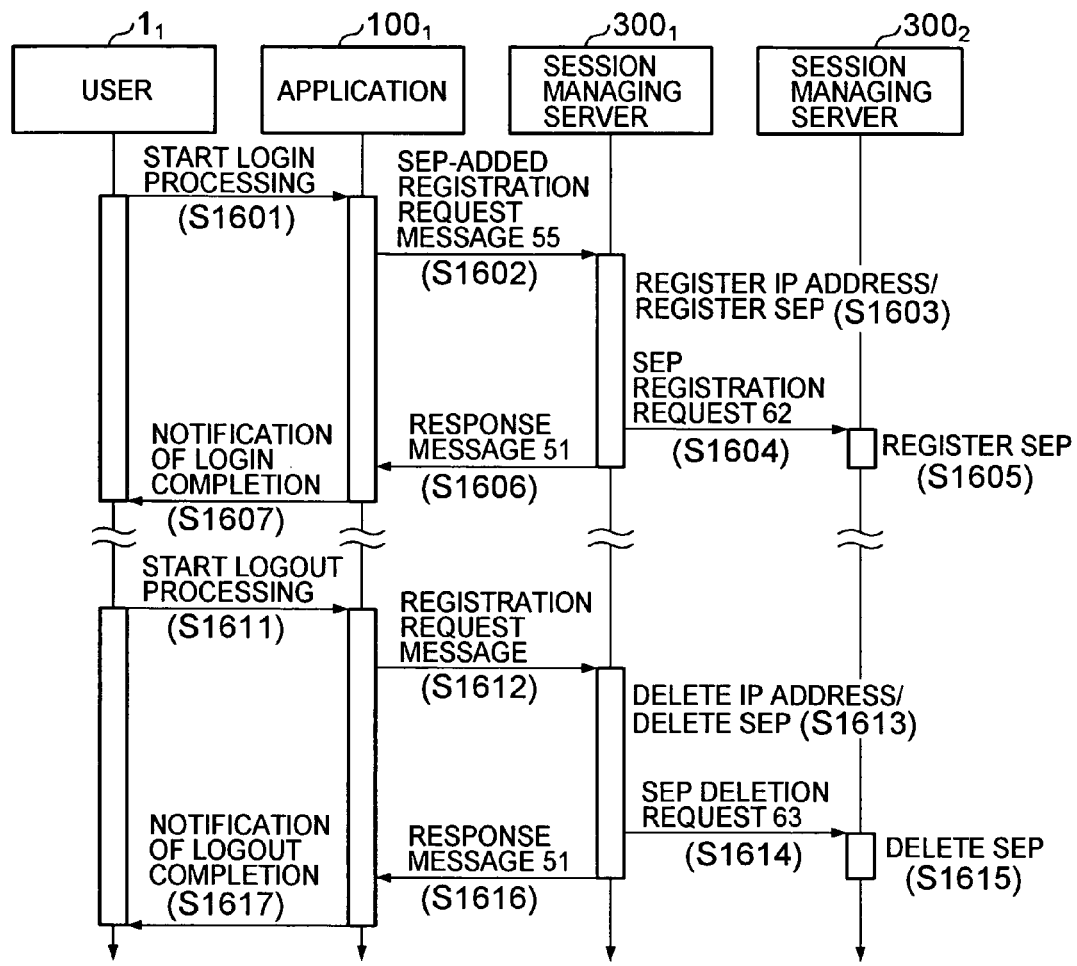
FIG. 17 illustrates an operation sequence when the application 100 logs in and logs out.

FIG. 17 is a diagram showing an operational sequence when the application $100_1$ logs in and logs out.

At first, the user $1_1$ requests the application $100_1$ to start up login processing to execute logging in (S1601). The application $100_1$ creates an SEP-added REGISTER message 55 which is obtained by adding to a REGISTER message an SEP 6 being held, and transmits the created message to the session managing server $300_1$ (S1602). In the session managing server $300_1$ which has received the SEP-added REGISTER message 55, the login managing function $301_1$ registers a combination of the sending source SIP-URI of the message and the IP address in the registrar DB $309_1$, as well as registering the SEP $6_{11}$ added to the message in the SEP DB $310_1$ (S1603). Next, in the session managing server $300_1$, the SEP sending function $306_1$ transmits an SEP registration request message 62 including the SEP $6_{11}$ to the session managing server $300_2$ (S1604). The session managing server $300_2$ which has received the SEP registration request message 62 takes out the SEP $6_{11}$ from the message, and registers the SEP in the SEP DB $310_2$ (S1605). When the session managing server $300_1$ transmits the SEP registration request message 62 to the session managing server $300_2$, the session managing server $300_1$ transmits a response message 51 to the application $100_1$ so as to notify that the login processing has been completed (S1606). The application $100_1$ which has received the response message 51 notifies the user $1_1$ that the login process is completed through a method such as displaying (S1607). Next, when the user $1_1$ requests the application $100_1$ to start logout processing for logging out (S1611), the application $100_1$ creates a REGISTER message 56 in which an effective period is set to zero, and transmits the created message to the session managing server $300_1$ (S1612). Since the session managing server $300_1$ has received the REGISTER message 56 in which the effective period is zero, the login managing function $301_1$ deletes a combination of the sending source SIP-URI of the message and the IP address from the registrar DB $309_1$, as well as deleting the SEP 6 associated with the sending source SIP-URI from the SEP DB $310_1$ (S1613). In the session managing server $300_1$, the SEP sending function $306_1$ transmits to the session managing server $300_2$, an SEP deletion request message 63 including the above sending source SIP-URI (S1614). The session managing server $300_2$ which has received the SEP deletion request message 63 takes out the above sending source SIP-URI from the message, and deletes the SEP 6 being associated with the SIP-URI from the SEP DB $310_2$ (S1615). After the session managing server $300_1$ transmits the SEP deletion request message 63 to the session managing server $300_2$, the session managing server $300_1$ transmits a response message 51 to the application $100_1$ so as to inform that the logout processing is competed (S1616). The application $100_1$ which has received the response message 51 notifies the user $1_1$ that the logout processing is completed through a method such as displaying (S1617). It is to be noted here that a format conforming to the SIP message may be employed for the SEP registration request message 62 and the SEP deletion request message 63 in Example 2.

FIG. 15C and FIG. 15D are illustrations respectively showing the SEP registration request message 62 and the SEP deletion request message 63. FIG. 15C shows the SEP registration request message 62 with which the session managing server $300_1$ requests the session managing server $300_2$ to register the SEP $6_{11}$ of the application $100_1$. FIG. 15D shows the SEP deletion request message 63 with which the session managing server $300_1$ requests the session managing server $300_2$ to delete the SEP $6_{11}$ of the application $100_1$.

In the SEP registration request message 62 as shown in FIG. 15C, there is described a character string "ADDSEP" in the first line, indicating that the message is an SEP registration request message 62. In the sending destination field starting from the character string "To:" there is described information of the sending destination of the message, that is, the domain name of the session managing server $300_2$. In the sending source field starting from the character string "From:" there is described identification information indicating an object of the SEP 6 to be registered, that is, SIP-URI of the application $100_1$. Furthermore, in two lines starting from "Call-ID" and "CSeq" respectively, there are described information items to uniquely identify the SEP registration request message 62. In addition, SEP 6 is described in an area interposed between two character strings "<SEP>" and "</SEP>".

In the SEP deletion request message 63 as shown in FIG. 15D, there is described a character string "DELSEP" in the first line, indicating that the message is an SEP deletion request message 63. In the sending destination field starting from the character string "To:" there is described information of the sending destination of the message, that is, the domain name of the session managing server $300_2$. In the sending source field starting from the character string "From:" there is described identification information indicating an object of the SEP 6 to be deleted, that is, SIP-URI of the application $100_1$. Furthermore, in two lines starting from "Call-ID" and "CSeq" respectively, there are described information items to uniquely identify the SEP deletion request message 63.

Operations in the system according to Example 2 in the case where the application 100 logs in and logs out have been explained in the foregoing description.

Operations when the service 2 logs in and logs out are the same as the case of the application 100 which performs login and logout.

In Example 2, when the user 1 modifies the SEP 6, it is assumed that the SEP 6 held by the application 100 is modified in advance, and then the login processing is restarted. This operation is the same when the SEP 6 of the service 2 is modified.

Next, operations will be explained specifically for the case where the application 100 establishes a communication session with the service 2 in the system of Example 2.

Since the operations of the application 100, the service 2, and the conformity judging service 402 are the same as the operations of Example 1, tedious explanations will not be made.

The operations of the session managing server 300 in Example 2 are similar to those of the session managing server 300 of Example 1. It is to be noted, however, the session managing server 300 of Example 2 obtains an SEP 6 from the SEP DB 310 when access judgment is requested, instead of obtaining the SEP 6 from the session managing server 300 or using the SEP 6 added to the evidence-added INVITE message 53.

Figure 18:
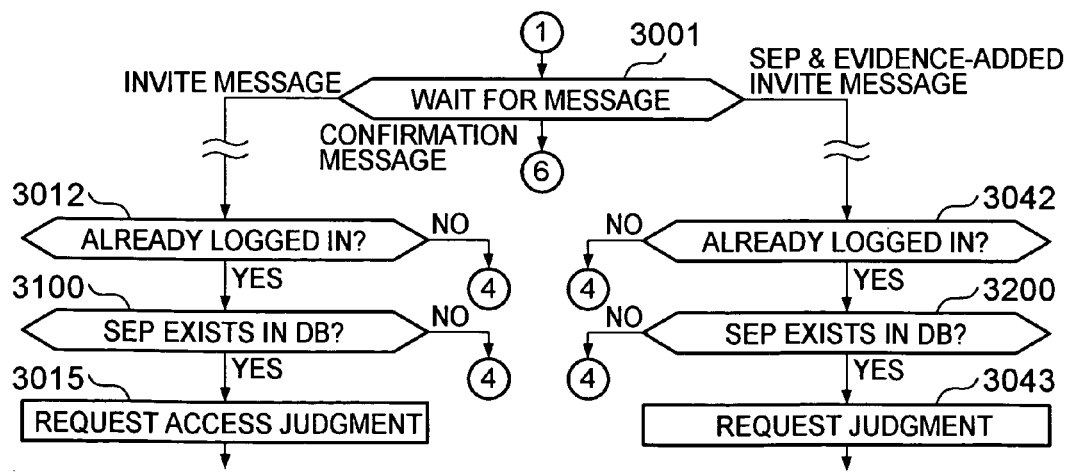
FIG. 18 illustrates a part of the operations of the session managing server 300 of Example 2, the part being different from Example 1.

FIG. 18 is a diagram showing operations of the session managing server 300 of Example 2, a part of operations being different from Example 1.

Firstly, since the session managing server 300 of Example 2 will not receive an SEP sending request message 60, operations of step 3021 and step 3022 do not exist.

When the session managing server 300 of Example 2 receives an INVITE message 50 with the domain name of the sending destination SIP-URI agreeing with the domain name of another session managing server 300 and the domain name of the sending source SIP-URI agrees with the domain name of its own, the processing shifts to step 3012, as in the case of the session managing server 300 of Example 1.

In step 3012, if the application 100 (or server 2) of the sending source SIP-URI has not logged in yet, the processing from step 3036 is executed as in the case of the session managing server 300 of Example 1.

On the other hand, if it has already logged in, instead of executing step 3013, the processing shifts to step 3100, and the session managing server 300 searches the SEP DB 310 for an SEP 6 being associated with the sending destination SIP-URI.

Here, if the SEP 6 does not exist in the SEP DB 310, the processing from step 3036 is executed.

On the other hand, if the SEP 6 exists in the SEP DB 310, processing from step 3015 is executed.

When the session managing server 300 of Example 2 has received an evidence-added INVITE message 53 with the domain name of the sending source SIP-URI agreeing with the domain name of another session managing server 300 and the domain name of the sending destination SIP-URI agrees with the domain name of its own, the processing shifts to step 3042, as in the case of the session managing server 300 of Example 1.

In step 3042, if the application 100 (or service 2) of the sending destination SIP-URI has not logged in yet, the processing from step 3036 is executed as in the case of the session managing server 300 of Example 1.

On the other hand, if it has already logged in, instead of executing step 3043, processing shifts to step 3200, and the session managing server 300 searches the SEP DB 310 for an SEP 6 being associated with the sending source SIP-URI.

Here, if the SEP 6 does not exist in the SEP DB 310, processing from step 3036 is executed.

On the other hand, if the SEP 6 exists in the SEP DB 310, processing from step 3043 is executed.

As for the part other than those described above, the operations of the session managing server 300 of Example 2 are the same as those of Example 1. Therefore, tedious explanations will not be made.

Operations in the system according to Example 2 when the application 100 establishes a communication session with the service 2 have been explained in the foregoing description.

In the system of Example 2, when the application 100 or the service 2 logs in, an SEP 6 is sent and received between the session managing servers 300, so as to share the SEP 6. With this configuration, it is not necessary to send and receive an SEP 6 in processing the INVITE message 50, and thus here is produced an effect that establishment of communication session can be carried out at high speed.

It is to be noted, in Example 2, when the application 100 or the service 2 logs in, the SEP 6 is sent and received between the session managing servers 300, but the present invention is not limited to this. It is also possible that the SEP 6 held by the session managing server 300 is transmitted to another session managing servers 300 repeatedly (for example, with predetermined time intervals). With this configuration, for example, even though the session managing server $300_2$ temporarily suspends a service, it is possible to receive all the SEP 6 from the session managing server $300_1$ when the service is resumed.

In addition, when the session managing server 300 has received an SEP registration request message 63, a response message may be returned. With this configuration, there is produced an effect that it is possible to resend the SEP registration request message 63 to the session managing server 300 from which a response message has not been returned.

Furthermore, in Example 2, the SEP registration request message 62 and the SEP deletion request messages 63 use a message in a format conforming to SIP message. However, the present invention is not limited to this.

For example, a message of an original format may be employed. Alternatively, an SIP message such as an INFO message or a MESSAGE message may be used, and a command for requesting/responding to send, register, or delete the SEP may be described in the body part of the SIP message. With this configuration, there is produced an effect that an SEP can be obtained at a higher speed, or a session managing function 302 conforming to the SIP can be used.

In addition, Example 1 and Example 2 may be combined appropriately for implementation.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A communication session mediating system, in which a first session managing device that a user of a first client logs in and a second session managing device that a user of a second client logs in cooperate to establish a communication session between the first client and the second client, wherein:

the first session managing device comprises
a session establishment policy (SEP) obtaining function which
specifies, upon arrival of a first connection request message having been sent from the first client for establishing a communication session between the first client and the second client, the user of the second client from the first connection request message to make a communication session establishment judgment,
creates an SEP sending request message to request an SEP of the user of the second client, which describes a condition to be satisfied by one or more attributes of the user of the first client under which the user of the second client permits an establishment of the communication session,
sends the SEP sending request message to the second session managing device, and
obtains from the second session managing device, the SEP of the user of the second client;

the second session managing device comprises
    a second SEP managing function which manages the SEP of the user of the second client, and
    an SEP sending function which sends, upon receipt of the SEP sending request message from the first session managing device, the SEP of the user of the second client which is managed by the second SEP managing function to the first session managing device,
the communication session mediating system further comprises a first attribute information managing device which comprises
    a first attribute information managing function which manages attribute information of the user of the first client; and
    a first conformity judging function which determines whether or not the attribute information of the user of the first client satisfies the SEP of the user of the second client, on the basis of the SEP of the user of the second client and the user of the first client being specified by the first session managing device,
the first session managing device further comprises a first session control function which
    requests the first attribute information managing device to perform first conformity judging by specifying the SEP of the user of the second client obtained by the SEP obtaining function and the user of the first client, upon receipt of the SEP of the user of the second client from the second session managing device;
    mediates the establishment of the communication session when the attribute information of the user of the first client satisfies the SEP of the user of the second client as a result of the first conformity judging; and
the first session managing device further comprises an evidence creating function which creates first evidence data from the result of the first conformity judging, the first evidence showing that the first conformity judging has been made, and
the first session control function further includes the first evidence data created by the evidence creating function in an invite message to be sent to the second session managing device when mediating the establishment of the communication session.

2. The communication session mediating system according to claim 1, further comprising:
    a second attribute information managing device which comprises a second attribute information managing function which manages the attribute information of the user of the second client; and
    a second conformity judging function which determines whether or not the attribute information of the user of the second client satisfies an SEP of the user of the first client, which describes a condition to be satisfied by one or more attributes of the user of the second client under which the user of the first client permits the establishment of the communication session, on the basis of the SEP of the user of the first client and the user of the second client which are specified by the second session managing device, wherein
the first session managing device further comprises a first SEP managing function which manages the SEP of the user of the first client;
the first session control function includes the SEP of the user of the first client in an invite message and sends the invite message to the second session managing device; and
the second session managing device further comprises a second session control function which
    requests the second attribute managing device to perform conformity judgment by specifying the SEP of the user of the first client received from the first session managing device and the user of the second client, upon receipt of the invite message including the SEP of the first client from the first session managing device, and
    mediates the establishment of the communication session, when the attribute information of the user of the second client satisfies the SEP of the user of the first client as a result of the second conformity judging.

3. The communication session mediating system according to claim 1, wherein:
    the first session managing device further comprises a first SEP receiving function which registers the SEP received from the second session managing device in the first SEP managing function, and
    the second session managing device further comprises a second SEP receiving function which registers the SEP received from the first session managing device in the second SEP managing function.

4. The communication session mediating system according to claim 1, wherein:
    the second session managing device further comprises a second evidence verifying function which validates the first evidence data to verify whether or not a reliable judgment has been made; and
    the second session control function
    requests the second evidence verifying function to verify the first evidence data upon receipt of the invite message including the first evidence data, and
    sends a second connection request message to the second client, when it is determined that a reliable judgment has been made in the first session managing device as a result of verifying the first evidence data.

5. The communication session mediating system according to claim 4, wherein:
    the second session control function
    receives a response message to the second connection request message from the second client,
    creates an evidence-added response message based on the response message and including second evidence data created from the result of the second conformity judging, and
    sends the evidence-added response message thus created to the first session managing device.

6. The communication session mediating system according to claim 5, wherein:
    the first session managing device further comprises a first evidence verifying function which validates the second evidence data to verify whether or not a reliable judgment has been made;
    the first session control function requests the first evidence verifying function to verify the second evidence data, upon receipt of the evidence-added response message; and
    when the first evidence verifying function determines that a reliable judgment has been made in the first session managing device as a result of verifying the second evidence data, the first session control function sends to the first client the evidence-added response message from which the second evidence data has been deleted.

7. The communication session mediating system session managing device according to claim 5, wherein:

the second session control function generates a response message indicating that a connection request is declined when the connection request message is unattached with evidence data.

8. A session managing device which accepts a login from a user of a first client and mediates a session establishment between the first client and a second client, the session managing device comprising:

an attribute information managing device embedded with an attribute information managing function which manages attribute information of the user of the first client;

a session managing server embedded with a session establishment policy (SEP) obtaining function which:

specifies, upon receipt of a connection request message for establishing a communication session between the first client and the second client, the user of the second client from the connection request message to make a communication session establishment judgment, creates an SEP sending request message to request an SEP of a user of the second client, which describes a condition to be satisfied by one or more attributes of the user of the first client under which the user of the second client permits an establishment of the communication session, sends the SEP sending request message to an other session managing device, and obtains the SEP of the user of the second client from the other session managing device, wherein:

the attribute information managing device is embedded with a conformity judging function which determines whether or not the attribute information of the user of the first client satisfies the SEP of the user of the second client, on the basis of the SEP obtained by the SEP obtaining function and the attribute information of the user of the first client being specified by the first session managing device;

a session managing server is embedded with:

a session control function which:

requests the conformity judging function to make a conformity judgment based on the SEP of the user of the second client obtained by the SEP obtaining function and the user of the first client, and mediates establishment of the communication session when the attribute information of the user of the first client satisfies the SEP of the user of the second client as a result of the conformity judging; and an evidence creating function which creates evidence data from the result of the conformity judgment, the evidence showing that the conformity judgment has been made, wherein the session control function includes the evidence data created by the evidence creating function in an invite message to be sent to the other session managing device when mediating the establishment of the communication session.

9. The session managing device according to claim 8, further comprising:

an SEP managing function which manages an SEP of the user of the first client, wherein the session control function adds the SEP of the user of the first client to the connection request message, the SEP of the user of the first client, which describes a condition to be satisfied by one or more attributes of the user of the second client under which the user of the first client permits the establishment of the communication session, and sends the connection request message thus obtained to the other session managing device.

* * * * *